(12) United States Patent
Motoyama

(10) Patent No.: US 8,272,028 B2
(45) Date of Patent: Sep. 18, 2012

(54) APPROACH FOR MANAGING ACCESS TO ELECTRONIC DOCUMENTS ON NETWORK DEVICES USING DOCUMENT RETENTION POLICIES AND DOCUMENT SECURITY POLICIES

(75) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 1008 days.

(21) Appl. No.: 12/252,320

(22) Filed: Oct. 15, 2008

(65) Prior Publication Data

US 2010/0095349 A1    Apr. 15, 2010

(51) Int. Cl.
H04L 29/00    (2006.01)

(52) U.S. Cl. ............. 726/1; 726/3; 726/4; 726/5; 726/6; 726/7; 726/8; 726/9; 726/10

(58) Field of Classification Search .......................... None
See application file for complete search history.

(56) References Cited

U.S. PATENT DOCUMENTS

| | | |
|---|---|---|
| 4,426,680 A | 1/1984 | Tague et al. |
| 4,451,742 A | 5/1984 | Aswell |
| 4,584,641 A | 4/1986 | Guglielmino |
| 4,639,864 A | 1/1987 | Katzman et al. |
| 5,007,053 A | 4/1991 | Iyer et al. |
| 5,130,922 A | 7/1992 | Liu |
| 5,265,159 A | 11/1993 | Kung |
| 5,313,632 A | 5/1994 | Sekizawa et al. |
| 5,325,523 A | 6/1994 | Beglin et al. |
| 5,359,713 A | 10/1994 | Moran et al. |
| 5,375,227 A | 12/1994 | Akatsu et al. |
| 5,388,156 A | 2/1995 | Blackledge, Jr. et al. |
| 5,414,827 A | 5/1995 | Lin |

(Continued)

FOREIGN PATENT DOCUMENTS

DE    41 35 767 A1    5/1993

(Continued)

OTHER PUBLICATIONS

Santry, et al., Deciding when to forget in the Elephant file system, Dec. 1999, ACM SIGOPS Operating Systems Review, vol. 33, Issue 5, pp. 110-123.

(Continued)

*Primary Examiner* — Philip Chea
*Assistant Examiner* — Ghazal Shehni
(74) *Attorney, Agent, or Firm* — Hickman Palermo Truong Becker Bingham Wong LLP; Edward A. Becker

(57) ABSTRACT

An approach for managing access to electronic documents uses document retention and document security policies. In response to detecting a request to access a particular electronic document stored on a network device, a document retention policy and a document security policy are applied to the particular electronic document. If, based upon application of the document retention policy to the particular electronic document, a determination is made that the particular electronic document is to be deleted, then the particular electronic document is deleted from the network device. If, based upon application of the document security policy to the particular electronic document, a determination is made that access to the particular electronic document should be denied, then access to the particular electronic document is denied. Retention policy audits, automatic or manual loading or auto-destruction code and self-extracting and executable data may also be used to enforce document retention and document security policies.

20 Claims, 16 Drawing Sheets

U.S. PATENT DOCUMENTS

| | | | |
|---|---|---|---|
| 5,428,766 | A | 6/1995 | Seaman |
| 5,438,674 | A | 8/1995 | Keele et al. |
| 5,448,719 | A | 9/1995 | Schult et al. |
| 5,457,748 | A | 10/1995 | Bergum et al. |
| 5,469,573 | A | 11/1995 | McGill, III et al. |
| 5,475,834 | A | 12/1995 | Anglin et al. |
| 5,499,012 | A | 3/1996 | Tracy et al. |
| 5,515,540 | A | 5/1996 | Grider et al. |
| 5,544,356 | A | 8/1996 | Robinson et al. |
| 5,630,044 | A | 5/1997 | Suzuki |
| 5,638,509 | A | 6/1997 | Dunphy et al. |
| 5,652,830 | A | 7/1997 | Yamamoto et al. |
| 5,664,089 | A | 9/1997 | Byers et al. |
| 5,682,471 | A | 10/1997 | Billings et al. |
| 5,761,705 | A | 6/1998 | DeKoning et al. |
| 5,787,247 | A | 7/1998 | Norin et al. |
| 5,835,953 | A | 11/1998 | Ohran |
| 5,913,025 | A | 6/1999 | Higley et al. |
| 5,933,584 | A | 8/1999 | Maniwa |
| 5,943,688 | A | 8/1999 | Fisher et al. |
| 5,991,895 | A | 11/1999 | Laudon et al. |
| 6,006,311 | A | 12/1999 | Arimilli et al. |
| 6,009,500 | A | 12/1999 | Rossi |
| 6,035,379 | A | 3/2000 | Raju et al. |
| 6,078,404 | A | 6/2000 | Natsume et al. |
| 6,088,815 | A | 7/2000 | West et al. |
| 6,092,173 | A | 7/2000 | Sasaki et al. |
| 6,119,209 | A | 9/2000 | Bauman et al. |
| 6,138,125 | A | 10/2000 | DeMoss |
| 6,185,507 | B1 | 2/2001 | Huber et al. |
| 6,301,670 | B1 | 10/2001 | Motoyama et al. |
| 6,304,948 | B1 | 10/2001 | Motoyama et al. |
| 6,317,217 | B1 | 11/2001 | Toda |
| 6,665,082 | B1 | 12/2003 | Takeoka et al. |
| 6,915,435 | B1 | 7/2005 | Merriam |
| 7,331,725 | B2 * | 2/2008 | Troyansky et al. ........... 400/106 |
| 2001/0038462 | A1 | 11/2001 | Teeuwen et al. |
| 2002/0010708 | A1 | 1/2002 | McIntosh |
| 2002/0194014 | A1 | 12/2002 | Starnes et al. |
| 2003/0126215 | A1 | 7/2003 | Udell et al. |
| 2003/0236788 | A1 | 12/2003 | Kanellos et al. |
| 2004/0162876 | A1 * | 8/2004 | Kohavi ......................... 709/203 |
| 2004/0186836 | A1 | 9/2004 | Schlesinger |
| 2005/0055518 | A1 | 3/2005 | Hochberg et al. |
| 2005/0114672 | A1 | 5/2005 | Duncan et al. |
| 2005/0160481 | A1 | 7/2005 | Todd et al. |
| 2005/0223242 | A1 * | 10/2005 | Nath ............................. 713/193 |
| 2005/0223414 | A1 | 10/2005 | Kenrich et al. |
| 2006/0010301 | A1 | 1/2006 | Yagawa |
| 2006/0075001 | A1 | 4/2006 | Canning et al. |
| 2006/0101285 | A1 | 5/2006 | Chen et al. |

FOREIGN PATENT DOCUMENTS

| | | |
|---|---|---|
| JP | 58012055 A | 1/1983 |
| JP | 61-240351 A | 10/1986 |
| JP | 4-205492 A | 7/1992 |
| JP | 5165685 A | 7/1993 |
| JP | 5324421 A | 12/1993 |
| JP | 10-27105 A | 1/1998 |
| JP | 2003316774 A | 11/2003 |
| JP | 2003330783 A | 11/2003 |
| JP | 2004206466 A | 7/2004 |
| SE | 8003932-4 A | 1/1982 |
| WO | WO 97/30447 A1 | 8/1997 |

OTHER PUBLICATIONS

IBM Corp., "Encryption Key Security by Electric Field Destruction of Memory Cells," IBM Technical Disclosure Bulletin, vol. 31, No. 8, Jan. 1989, 7 pages.

* cited by examiner

DOCUMENT RETENTION POLICY DATA

| DOCUMENT RETENTION CLASSIFICATION | DELETION CRITERIA | DOCUMENT TYPES | CLASSIFICATION DESCRIPTION |
|---|---|---|---|
| P0 | NONE | O | PUBLISHED TO OUTSIDE |
| L1 | 5 YEARS | O | MEETING RECORDS |
| L2 | 7 YEARS | O | ACCOUNTING RECORDS |
| C1 | 5 YEARS | O & P | GENERAL DOCUMENTS |
| C2 | 3 YEARS | O | GENERAL MEETING RECORDS |
| C3 | 1 YEAR | O | TEMPORARY DOCUMENTS |
| C4 | END OF PROJECT | O | PROJECT "A" DATA |

DOCUMENT SECURITY POLICY DATA

| DOCUMENT SECURITY CLASSIFICATION | DESCRIPTION | ACCESS POLICY |
|---|---|---|
| U | UNCLASSIFIED | ANYONE |
| R1 | SECURITY LEVEL 1 | COMPANY |
| R2 | SECURITY LEVEL 2 | COMPANY GROUP |
| R3 | SECURITY LEVEL 3 | MANAGER AND ABOVE |
| R4 | SECURITY LEVEL 4 | DIRECTOR AND ABOVE |
| R5 | SECURITY LEVEL 5 | COMPANY OFFICERS ONLY |
| S | SPECIFIED PERSONS | LIST OF SPECIFIED PEOPLE (DEFAULT: CREATOR ONLY) |

FILE INFORMATION TABLE

| DOCUMENT NAME | CREATION DATE | LOCATION | RETENTION CLASSIFICATION | SECURITY CLASSIFICATION |
|---|---|---|---|---|
| F1 | XX/YY/ZZ | L | L2 | R2 |
| F2 | XX/YY/ZZ | L | C2 | R1 |
| F3 | XX/YY/ZZ | L | C4 | R5 |
| F4 | XX/YY/ZZ | R | C3 | U |
| F5 | XX/YY/ZZ | L | P0 | U |
| C3 | XX/YY/ZZ | R | L1 | S |
| C4 | XX/YY/ZZ | O | L1 | R3 |

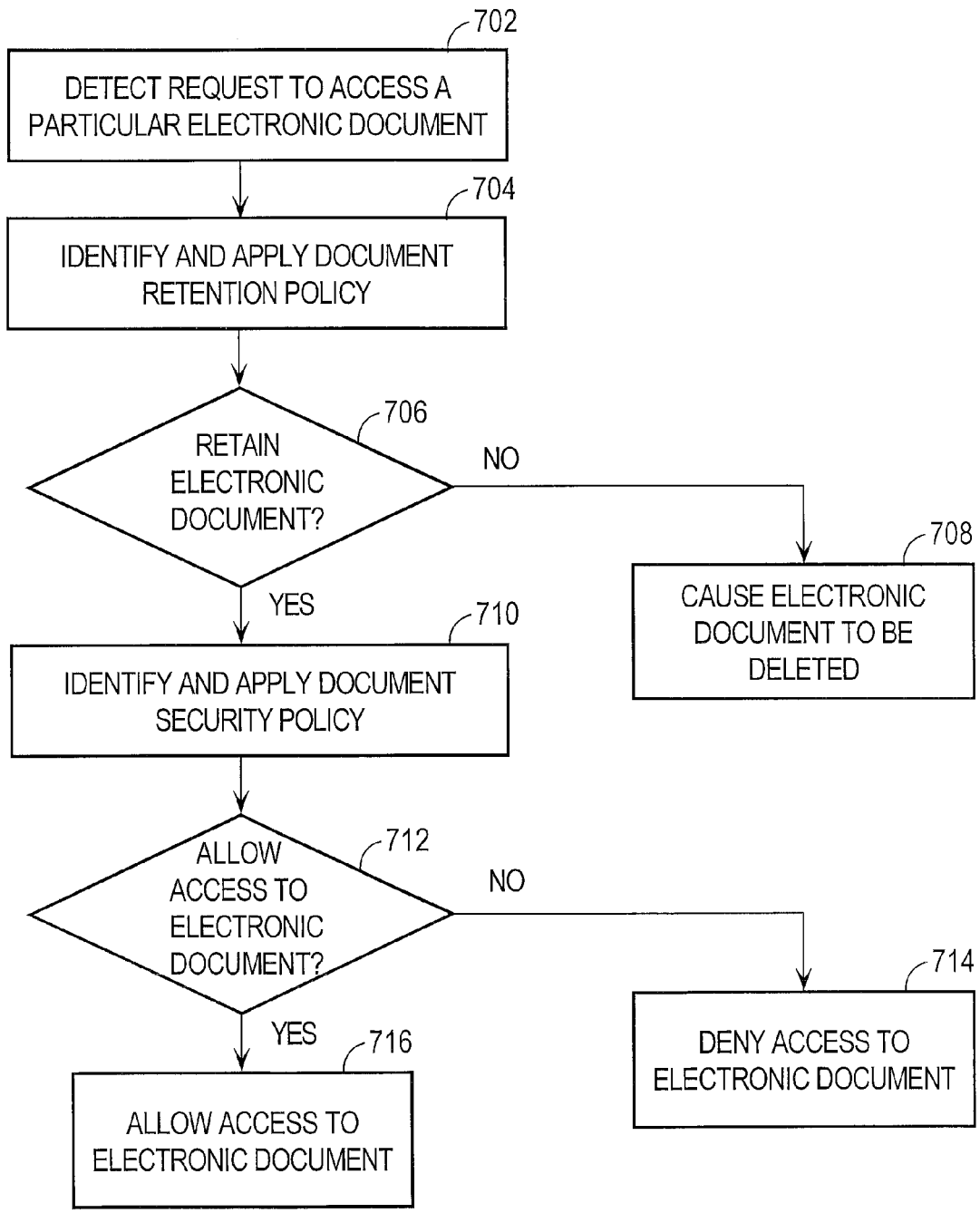

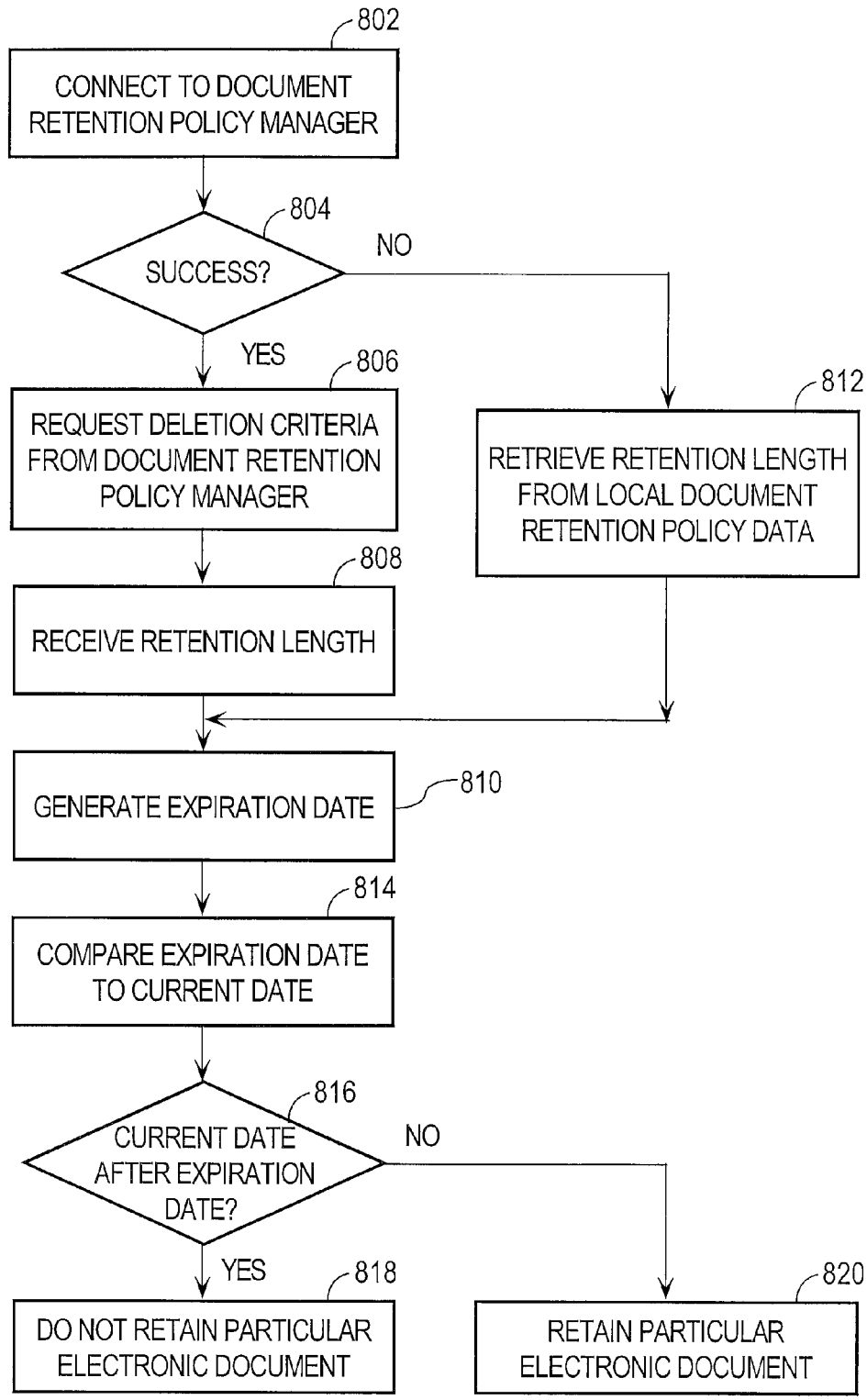

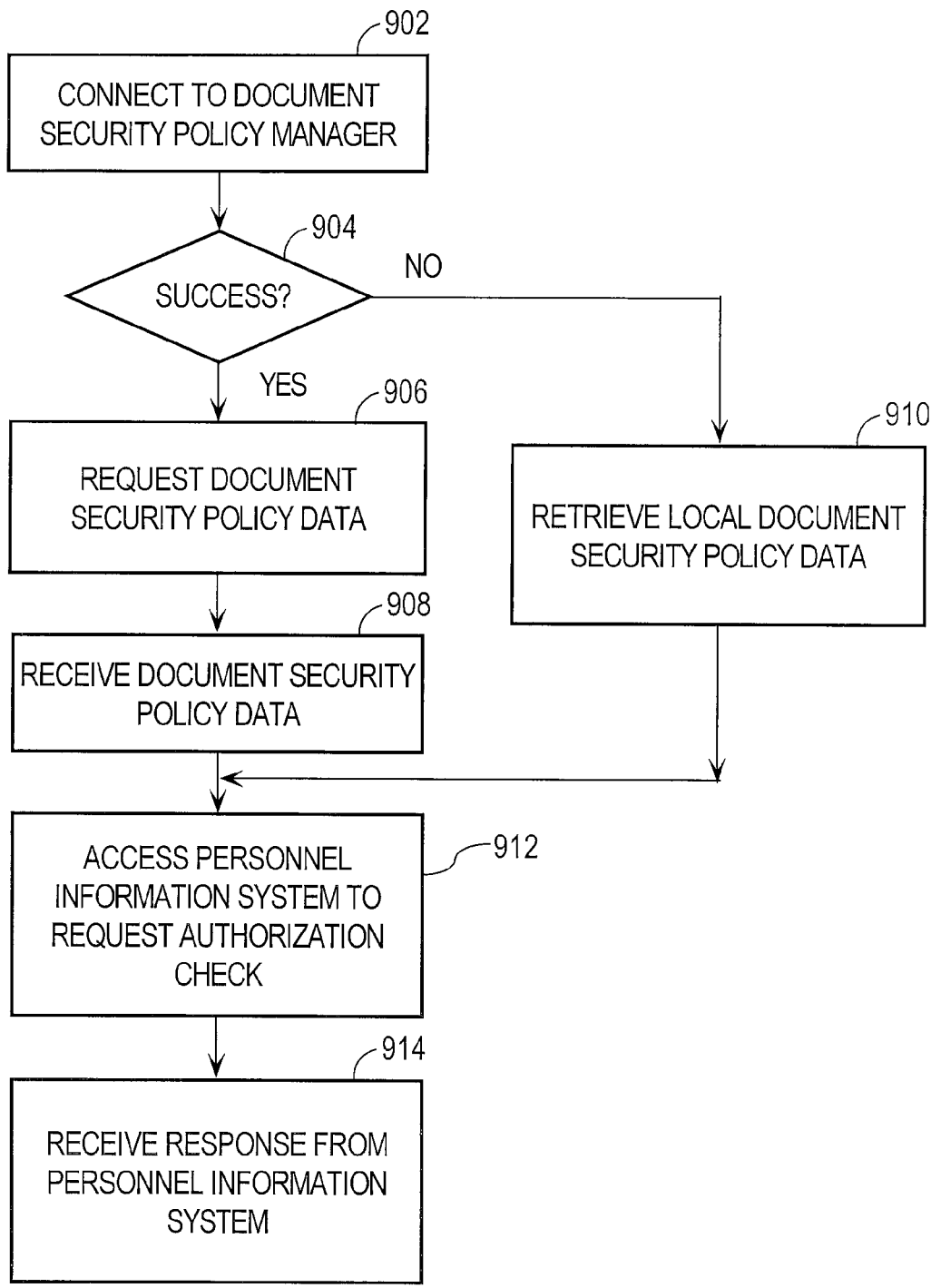

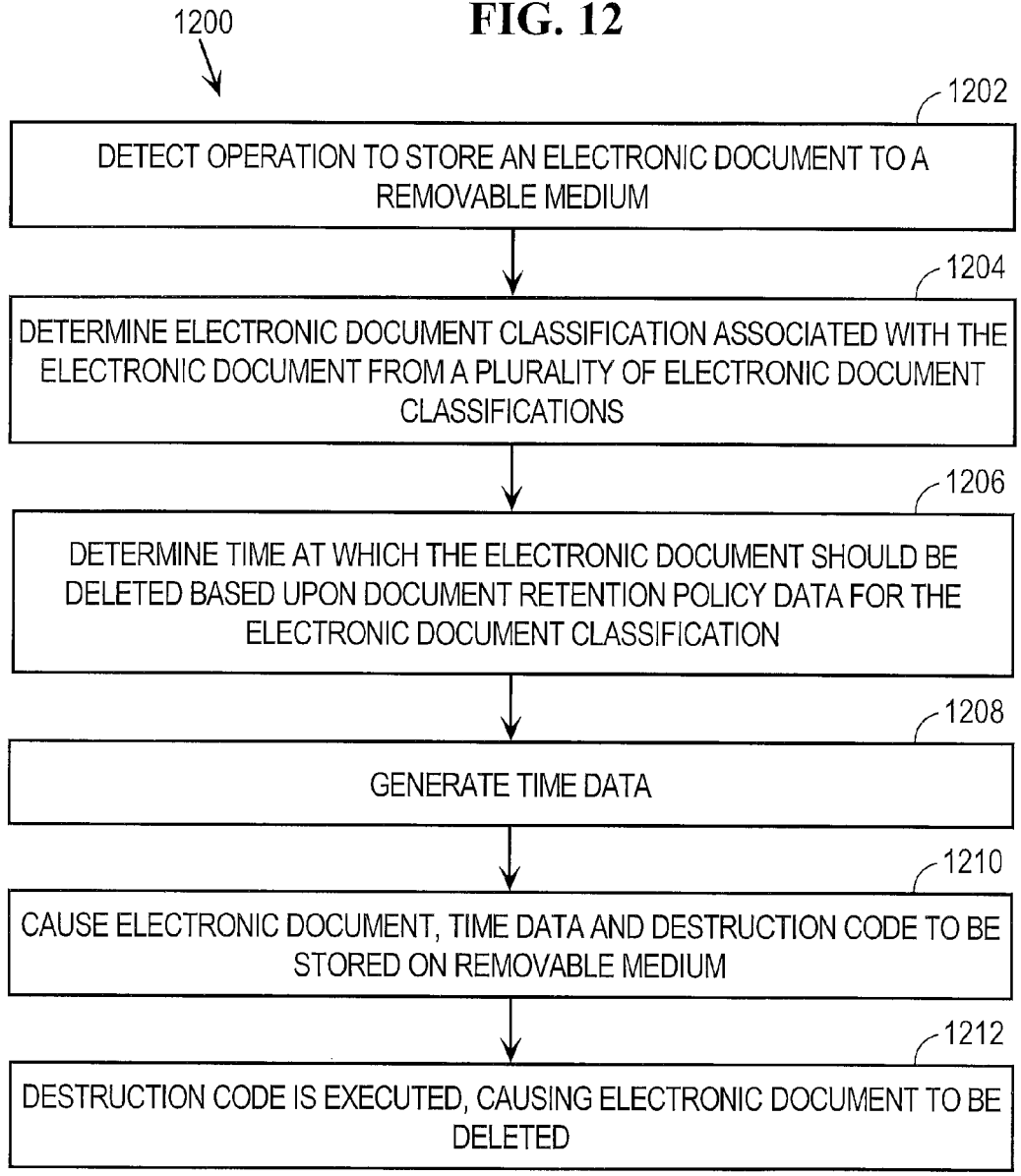

APPROACH FOR MANAGING ACCESS TO ELECTRONIC DOCUMENTS ON NETWORK DEVICES USING DOCUMENT RETENTION POLICIES AND DOCUMENT SECURITY POLICIES

RELATED APPLICATIONS

This application is related to U.S. patent application Ser. No. 11/034,483, filed on Jan. 5, 2005, entitled "Approach For Deleting Electronic Documents On Network Devices Using Document Retention Policies" and U.S. patent application Ser. No. 11/182,870, entitled "Approach for Deleting Electronic Documents on Network Devices Using Document Retention Policies," filed on Jul. 14, 2005, the contents all of which are hereby incorporated by reference in their entirety for all purposes.

FIELD OF THE INVENTION

This invention relates generally to electronic document management, and more specifically, to an approach for managing access to electronic documents on network devices using document retention policies and document security policies.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Many businesses have implemented document retention policies to define conditions under which documents are to be destroyed. Businesses typically destroy documents to reduce costs attributable to maintaining old documents and to reduce potential legal liability. Document retention policies may apply to physical documents as well as electronic documents.

One of the problems with document retention policies is the difficulty in uniformly applying a document retention policy to all copies of a particular document. For example, a document retention policy may specify the destruction of a particular document after a specified time. Some copies of the particular document may be readily obtained and destroyed. Other copies of the particular document may exist but may be difficult to locate. For example, copies of the particular document may have been sent to remote storage and may be difficult, if not impossible, to locate. In other situations, the existence of some copies of the particular document may not even be known. This may occur, for example, if copies of the particular document were made, but no record was made documenting that the copies were made. This can be potentially damaging if the unknown copies are later discovered in litigation by an adverse party. Furthermore, in some situations, adverse inferences may be drawn when only select copies of electronic documents are deleted. This problem is particularly acute for electronic documents, where many copies of a particular electronic document may be unknowingly made and stored at intermediate network node locations. As a result of this problem, document management systems have been developed to implement document retention policies for electronic documents. The effectiveness of these systems necessarily depends upon knowing about the existence of all copies of electronic documents and the locations of those copies. With the proliferation of wired and wireless networks, the many different types of network devices, e.g., computers, hand-held devices, personal digital assistants (PDAs), and the many different forms of electronic documents, e.g., email and messages, it is increasingly difficult to track the existence and location of all copies of an electronic document. Based on the foregoing, there is a need for an approach for managing access to electronic documents on network devices that does not suffer from limitations of prior approaches.

SUMMARY

An approach is provided for managing access to electronic documents using document retention policies and document security policies. The document retention policies specify a plurality of document retention classifications and one or more deletion criteria for documents belonging to each document retention classifications from the plurality of document retention classifications. For example, the document retention policy may specify that documents belonging to a particular document retention classification are to be deleted after a specified time, at a specified time or in response to the occurrence of a particular event. The document retention policies are defined by document retention policy data that is managed by a document retention policy manager. The document retention policy manager disseminates the document retention policy data to one or more network devices over a communications network. The document security policies specify a plurality of document security classifications and one or more access criteria for each document security classification from the plurality of document security classifications. The document security policies are defined by document security policy data that is managed by a document security management system. The document security management system disseminates the document security policy data to the one or more network devices over the communications network.

In response to detecting a request to access a particular electronic document stored on a network device, a document retention policy and a document security policy are applied to the particular electronic document. If, based upon application of the document retention policy to the particular electronic document, a determination is made that the particular electronic document is to be deleted, then the particular electronic document is deleted from the network device and the requester of the document may be notified. If, based upon application of the document security policy to the particular electronic document, a determination is made that access to the particular electronic document should be denied, then access to the particular electronic document is denied. Embodiments of the invention also include the document retention policy manager initiating retention policy audits, the use of automatic or manual loading or auto-destruction code to handle deleting electronic documents from removable media, as well as the use of self-extracting and executable data to automatically enforce document retention and document security policies.

According to one aspect of the invention, a computer-implemented approach is provided for managing access to electronic documents at a network device. A request to access a particular electronic document stored on the network device is detected. In response to detecting the request to access the particular electronic document stored on the network device, document retention policy data is retrieved that specifies a plurality of electronic document retention classifications and one or more deletion criteria for each electronic document retention classification from the plurality of electronic document retention classifications. A determination is made that the particular electronic document belongs to a particular electronic document retention classification from the plurality of electronic document retention classifications. A determination is made whether any of the one or more deletion criteria for the particular electronic document retention classification are satisfied. If any of the one or more deletion criteria for the particular electronic document retention classification are satisfied, then the particular electronic document is deleted. If none of the one or more deletion criteria for the particular electronic document retention classification are satisfied, then document security policy data is retrieved that specifies a plurality of document security classifications and one or more access criteria for each document security classifications from the plurality of document security classifications. A determination is made that the particular electronic document belongs to a particular document security classification from the plurality of document security classifications. A determination is also made, based upon one or more access criteria for the particular document security classification and one or more attributes of a user associated with the request to access the particular electronic document, whether the user is authorized to access the particular electronic document. If the user is not authorized to access the particular electronic document, then the user is prevented from accessing the particular electronic document.

BRIEF DESCRIPTION OF THE DRAWINGS

In the figures of the accompanying drawings like reference numerals refer to similar elements.

FIG. 7 is a flow diagram that depicts an approach for managing access to electronic documents using document retention policies and document security policies.

FIG. 8 is a flow diagram that depicts a document manager obtaining deletion criteria from a document retention policy manager.

FIG. 9 is a flow diagram that depicts an approach for applying a document security policy to an electronic document.

FIG. 12 is a flow diagram that depicts an approach for deleting electronic documents on a removable media.

DETAILED DESCRIPTION

Figure 1:
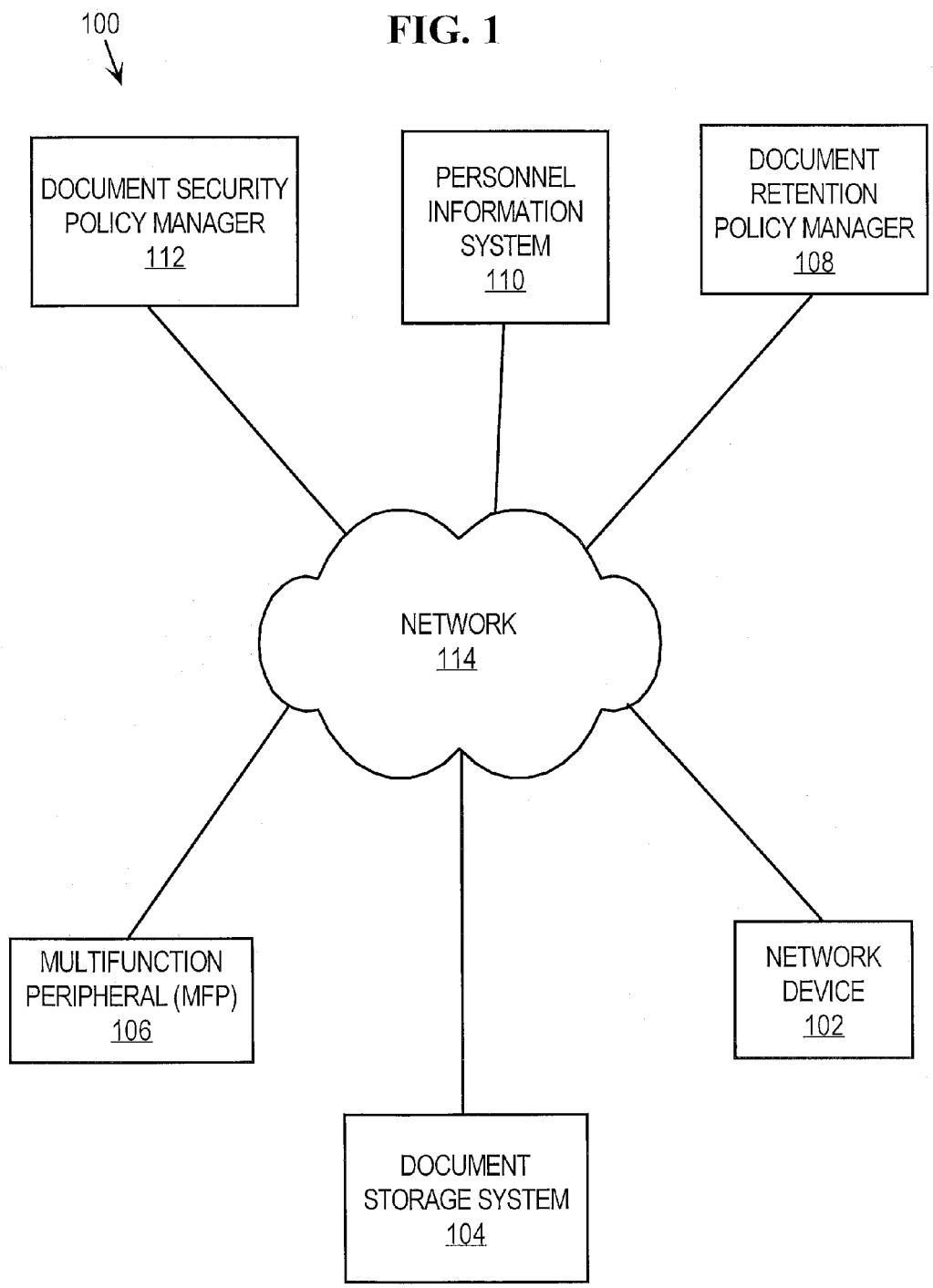
FIG. 1 is a block diagram that depicts an arrangement for managing access to electronic documents using a document retention policy and document security data.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ELECTRONIC DOCUMENT MANAGEMENT ARCHITECTURE
III. DOCUMENT RETENTION POLICIES
IV. CREATING, MAINTAINING AND DISTRIBUTING DOCUMENT RETENTION POLICIES
V. DOCUMENT SECURITY POLICIES
VI. CREATING, MAINTAINING AND DISTRIBUTING DOCUMENT SECURITY POLICIES
VII. MANAGING ACCESS TO ELECTRONIC DOCUMENTS USING DOCUMENT RETENTION POLICIES AND DOCUMENT SECURITY POLICIES
VIII. REMOVABLE MEDIA APPLICATIONS
   A. Auto-Loading and Manual Loading
   B. Auto-Destruction Code
IX. SELF EXTRACTING AND EXECUTABLE DATA IMPLEMENTATIONS
X. IMPLEMENTATION MECHANISMS I. Overview An approach is provided for managing access to electronic documents using document retention policies and document security policies. The document retention policies specify a plurality of document retention classifications and one or more deletion criteria for documents belonging to each document retention classifications from the plurality of document retention classifications. For example, the document retention policy may specify that documents belonging to a particular document retention classification are to be deleted after a specified time, at a specified time or in response to the occurrence of a particular event. The document retention policies are defined by document retention policy data that is managed by a document retention policy manager. The document retention policy manager disseminates the document retention policy data to one or more network devices over a communications network. The document security policies specify a plurality of document security classifications and one or more access criteria for each document security classification from the plurality of document security classifications. The document security policies are defined by document security policy data that is managed by a document security management system. The document security management system disseminates the document security policy data to the one or more network devices over the communications network.

In response to detecting a request to access a particular electronic document stored on a network device, a document retention policy and a document security policy are applied to the particular electronic document. If, based upon application of the document retention policy to the particular electronic document, a determination is made that the particular electronic document is to be deleted, then the particular electronic document is deleted from the network device. If, based upon application of the document security policy to the particular electronic document, a determination is made that access to the particular electronic document should be denied, then access to the particular electronic document is denied. Embodiments of the invention also include the document retention policy manager initiating retention policy audits, the use of automatic or manual loading or auto-destruction code to handle deleting electronic documents from removable media, as well as the use of self-extracting and executable data to automatically enforce document retention and document security policies.

II. Electronic Document Management Architecture

FIG. 1 is a block diagram that depicts an arrangement 100 for managing access to electronic documents using a document retention policy and document security data according to an embodiment of the invention. Arrangement 100 includes a network device 102, a document storage system 104, a multifunction peripheral (MFP) 106, a document retention retention policy manager 108, a personnel information system 110 and a document security policy manager 112 communicatively coupled to a network 114.

Network device 102 may be implemented by any type of network device. Examples of network device 102 include, without limitation, wired or wireless devices such as personal digital assistants (PDAs), portable or laptop computers and other network devices. Document storage system 104 may be implemented by any mechanism for storing electronic documents. Examples of document storage system 104 include, without limitation, a database management system and a file system. MFP 106 may be implemented by any device that performs one or more functions, such as printing, copying, facsimile or scanning. Document retention policy manager 108 is a system for managing document retention policy data. Personnel information system 110 is a system for storing personnel information. Document security policy manager 112 is a system for storing security policy data. Network 114 may be implemented by any mechanism or medium that provides for the exchange of information between the elements depicted in FIG. 1. Examples of network 114 include, without limitation, a network such as a Local Area Network (LAN), Wide Area Network (WAN), Ethernet or the Internet, or one or more terrestrial, satellite or wireless links. Although the various elements are depicted in FIG. 1 as being external to network 114, any of these elements may be implemented within network 114, depending upon the requirements of a particular implementation. The various elements depicted in FIG. 1 are described in more detail hereinafter.

III. Document Retention Policies

Figures 2, 3A:
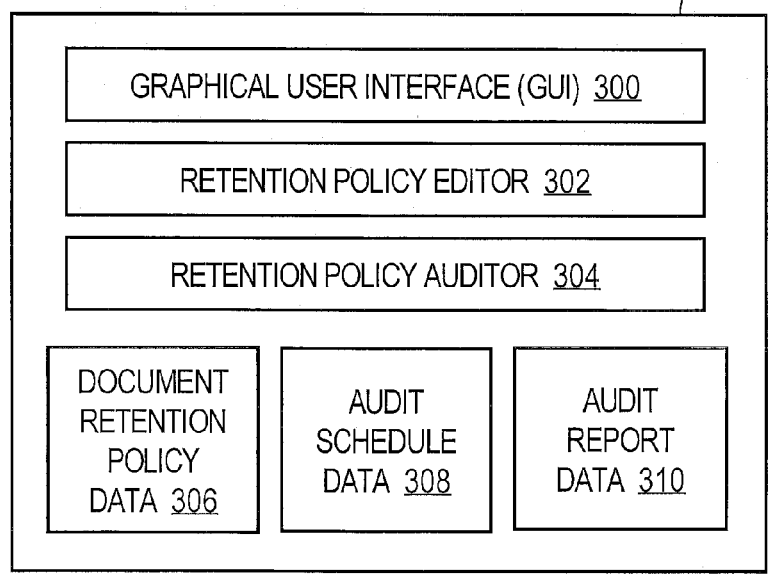
FIG. 2 is a table that depicts example document retention policy data that defines one or more document retention policies.
FIG. 3A depicts an example implementation of a document retention policy manager.

According to one embodiment of the invention, a document retention policy specifies one or more deletion criteria for a plurality of electronic document retention classifications. FIG. 2 is a table 200 that depicts example document retention policy data that defines one or more document retention policies. FIG. 2 depicts the document retention policy data organized in tabular format for explanation purposes only and the document retention policy data may be stored in any type of data structure or format, depending upon the requirements of a particular implementation. Furthermore, document retention policy data is not limited to the example data depicted in table 200 and may include fewer data types or more or more data types than depicted in FIG. 2, depending upon the requirements of a particular implementation.

In the example depicted in FIG. 2, table 200 includes a document retention classification column, a deletion criteria column, a document type column ("O"=official; "P"=private) and a classification description column. Each row of table 200 specifies a retention policy for a particular document retention classification. For example, the document retention classification L1 pertains to meeting records and has a document retention policy that specifies that documents in this classification are to be deleted after five years. In this example, the "L" in the document retention classification "L1" refers to a legal requirement where the length of retention is specified by law. As another example, the document retention classification C4 pertains to project "A" data and has a document retention policy that specifies that electronic documents in this document retention classification are to be deleted after the project has been completed. In this example, the "C" in the document retention classification "C4" refers to a corporate standard.

Any number and types of document retention classifications and deletion criteria may be used, depending upon the requirements of a particular implementation, and the invention is not limited to any particular number or types of document retention classifications or deletion criteria. For example, as described above, the deletion criteria may specify a time duration that may be applied on a document-by-document basis, based upon the creation date or storage date of the electronic documents. As another example, the deletion criteria may specify a date certain at which all constituent electronic documents of an electronic document retention classification are to be deleted. As another example, the deletion criteria may specify that all electronic documents associated with an electronic document retention classification are to be deleted in response to the occurrence of an event. Example events include a notification from administrative personnel and the completion of a project, as described above.

IV. Creating, Maintaining and Distributing Document retention Policies

According to one embodiment of the invention, document retention policy manager manager 108 provides for the creation and management of document retention policies that are defined by document retention policy data. FIG. 3A depicts an example implementation of document retention policy manager 108. In this example, document retention policy manager 108 is configured with a graphical user interface (GUI) 300, a retention policy editor 302 and a retention policy auditor 304. Document retention policy manager 108 also includes document retention policy data 306, audit schedule data 308 and audit report data 310. Document retention policy data 306 is described in this section, while audit schedule data 308 and audit report data 310 are described in later sections.

Retention policy editor 302 is configured to allow users to create, store and manage document retention policies via GUI 300. For example, retention policy editor 302 allows users to create document retention policy data 306, such as the document retention policy data contained in table 200, through the use of various editing controls. This may include, for example, allowing a user to edit "raw" document retention policy data 306 or display one or more templates on GUI 300 and allow the user to enter data into available fields. Alternatively, a user may retrieve existing document retention policy data 306 from document security policy manager 112 and a storage medium. Users may then edit the document retention policy data retrieved from the document security policy manager 112 and store the edited data in the document retention policy data 306. Users may also use the editing controls provided by retention policy editor 302 to delete document retention policy data 306. Document retention policy data 306 may be stored in a volatile memory, such as a random access memory (RAM), and/or stored on a non-volatile memory such as one or more disks, optical media or tape.

Figure 3B:
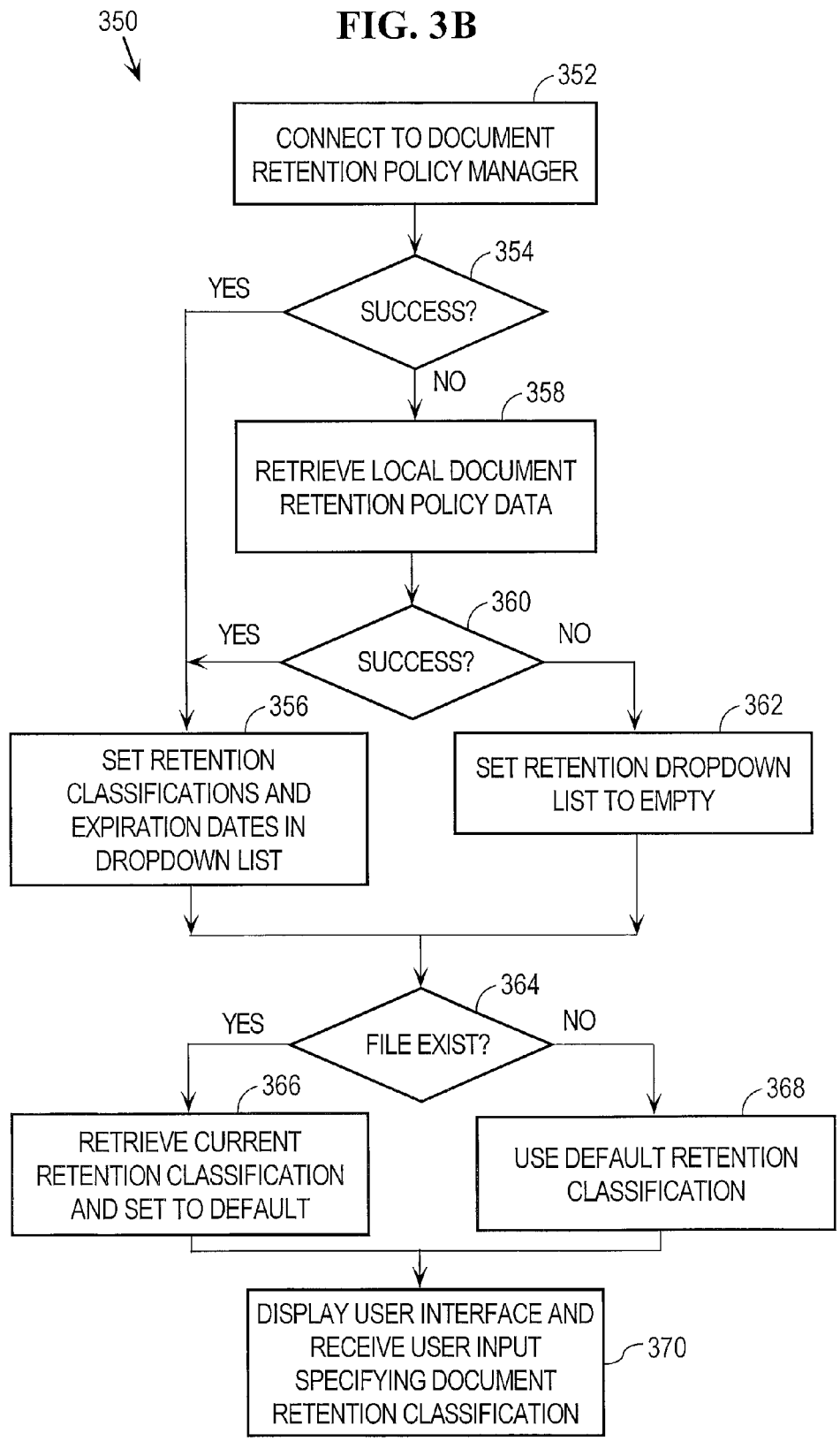
FIG. 3B is a flow diagram that depicts an example approach for editing document retention policy data.

FIG. 3B is a flow diagram 350 that depicts an example approach for editing document retention policy data for a particular electronic document, according to one embodiment of the invention. In step 352, retention policy editor 302 attempts to connect to document retention policy manager 108 via network 114. If in step 354 the connection attempt is successful, then in step 356 the retention classifications and expiration dates in a dropdown list are established based upon the document retention policy data received from document retention policy manager 108. If, in step 354 the connection attempt is not successful, then the retention policy editor 302 retrieves the local document retention policy data 306 stored on the data 306 stored on the network device 102. If the retrieval of the local document retention policy data 306 is successful, then control proceeds to step 356 as previously described. If the local document retention policy data 306 cannot be retrieved, then in step 362, the retention classification dropdown list is set to empty. In step 364 a determination is made whether the particular electronic document exists in the current document retention policy data. If so, then in step 366 the current retention classification for the particular electronic document is retrieved and used as the default value. If not, then in step 368, a default document retention classification is used. In step 370, the user interface is displayed and user input is received specifying a document retention classification and/or deletion criteria.

According to one embodiment of the invention, document retention policy manager 108 is configured to distribute document retention policy data 306 to network device 102, document storage system 104 and MFP 106. An MFP is a multi function machine that has capability of a scanner, a printer and/or a copier. Many MFPs can store the documents that are scanned, copied or printed. Therefore, the stored documents should follow the document retention policy and document security policy. Document retention policy manager 108 may be configured to automatically provide document retention policy data 306 to those elements that require the data. For example, document retention policy manager 108 may be configured to provide document retention policy data 306 to network devices based upon schedule data contained in audit schedule data 308. Document retention policy manager 108 may be configured to query network device 102 to determine whether network device 102 requires document retention policy data 306. Alternatively, network device 102 may request document retention policy data 306 from document retention policy manager 108. Furthermore, retention policy auditor 304 may be configured to provide document retention policy data 306 to network device 102 in response to document retention policy data 306 being updated. For example, suppose that a user updates document retention policy data 306 using retention policy editor 302. An administrator may determine that document retention policy data 306 needs to be updated to reflect a change in a document retention policy. According to one embodiment of the invention, retention policy auditor 304 is configured to automatically detect that document retention policy data 306 has been updated and provide the updated document retention policy data 306 to network device 102. Audit report data 310 may include data that report data 310 may include data that indicates details about the providing of document retention policy data 306 to network devices, such as network device 102. For example, audit report data 310 may indicate that a particular version of document retention policy data 306 was provided to network device 102. Audit report data 310 may also include data that indicates the results of a document retention policy audit conducted at one or more network devices, either alone or in conjunction with the application of document security policies to electronic documents in response to access requests, as described in more detail hereinafter.

V. Document Security Policies

Figures 4, 5A:
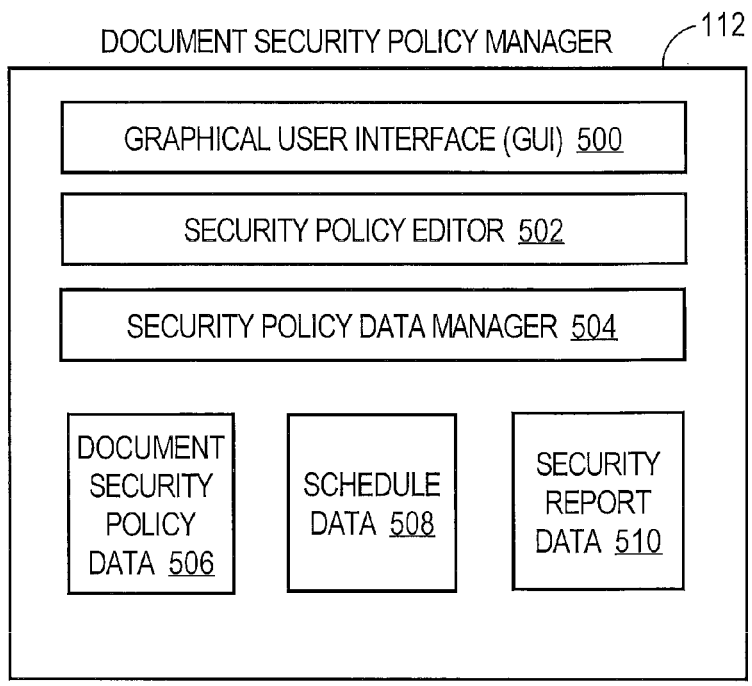
FIG. 4 is a table that depicts example document security policy data that defines one or more document security policies.
FIG. 5A depicts an example implementation of a document security policy manager.

According to one embodiment of the invention, a document security policy specifies one or more access criteria for a plurality of electronic document retention classifications. FIG. 4 is a table 400 that depicts example document security policy data that defines one or more document security policies. FIG. 4 depicts the document security policy data organized in tabular format for explanation purposes only and the document security policy data may be stored in any type of data structure or format, depending upon the requirements of a particular implementation. Furthermore, document security policy data is not limited to the example data depicted in table 400 and may include fewer data types or more data types than depicted in FIG. 4, depending upon the requirements of a particular implementation.

In the example depicted in FIG. 4, table 400 includes a document security classification column, a description column and an access policy column. Each row of table 400 corresponds to a document security classification and specifies a description and access policy for each document security classification. For example, the document security classification U pertains to unclassified documents that any user is permitted to access. As another example, the document security classification R1 pertains to a company. Users attempting to access documents having the R1 document security classification must be members of a specified company. The document security classification R2 pertains to a company group, meaning that a user attempting to access documents having the R2 document security classification must be members of a specified company group. As another example, document security classification R5 pertains to company officers only. This means that users attempting to access electronic documents having the R5 document security classification must be company officers. The document security classification "S" specifies a list of people who are authorized to access the electronic document. The names may be uniquely specified for a particular business organization. For example, the names may be the names used by the email system of a business organization.

Any number and types of document security classifications and access policies may be used, depending upon the requirements of a particular implementation, and the invention is not limited to any particular number or types of document security classifications or access policies.

VI. Creating, Maintaining and Distributing Document Security Policies

According to one embodiment of the invention, document security policy manager 112 provides for the creation and management of document retention policies that are defined by document retention policy data. FIG. 5A depicts an example implementation of document security policy manager 112. In this example, document security policy manager 112 is configured with a graphical user interface (GUI) 500, a security policy editor 502 and a security policy data manager 504. Document security policy manager 112 also includes document security policy data 506, schedule data 508 and security report data 510.

Security policy editor 502 is configured to allow users to create, store and manage document security policies via GUI 500. For example, security policy editor 502 allows users having the proper credentials to create document security policy data 506, such as the document security policy data contained in table 400, through the use of various editing controls. This may include, for example, allowing a user to edit "raw" document security policy data 506 or display one or more templates on GUI 500 and allow the user to enter data into available fields. Alternatively, an authorized user may retrieve existing document security policy data 506 from document security policy manager 112. Users may then edit and store the document security policy data 506. Authorized users may also use the editing controls provided by security policy editor 502 to delete document security policy data 506. Document security policy data 506 may be stored in a volatile memory, such as a random access memory access memory (RAM), and/or stored on a non-volatile memory such as one or more disks, optical media or tape.

Figure 5B:
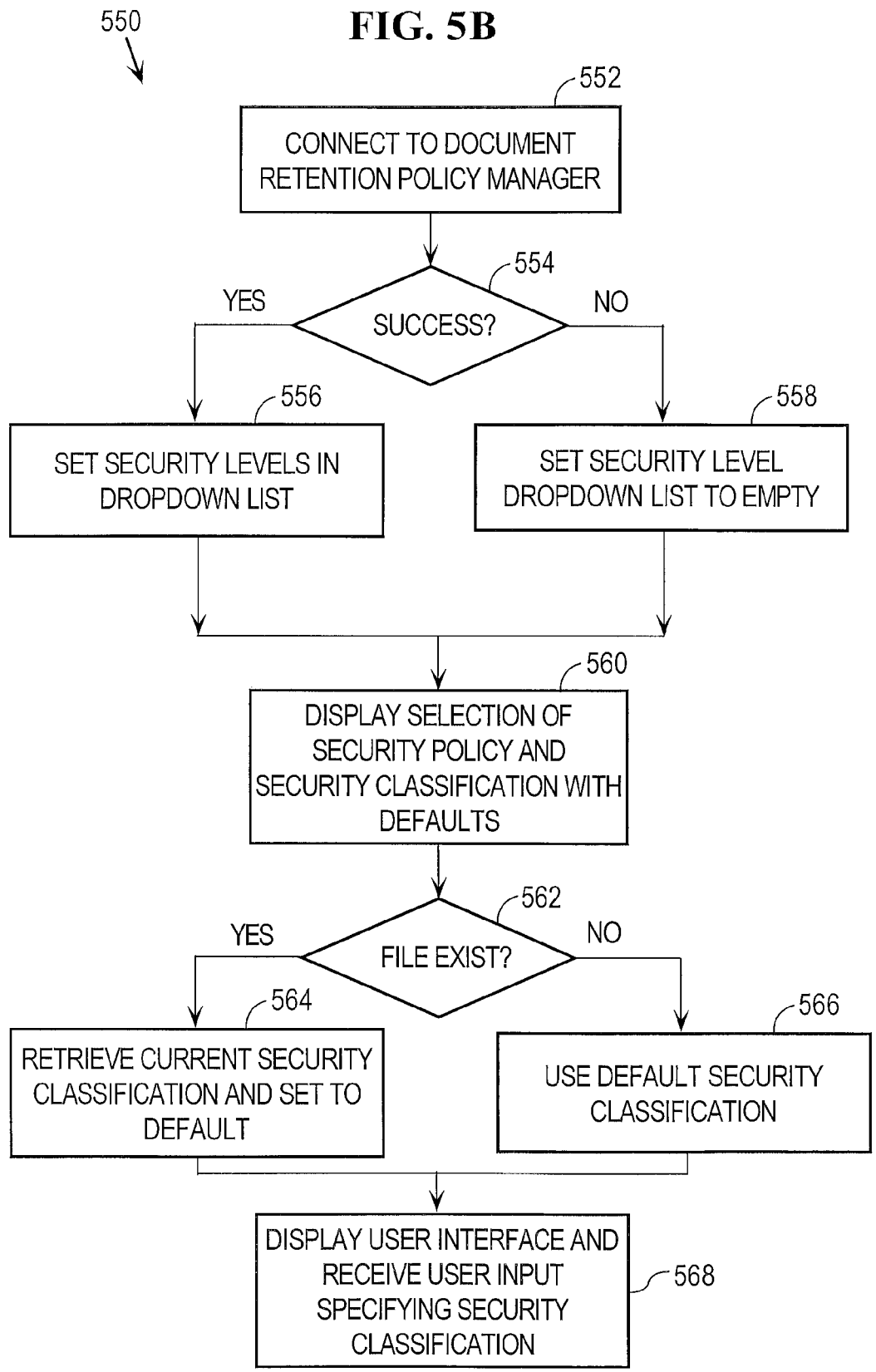
FIG. 5B is a flow diagram that depicts an example approach for editing document security policy data for a particular electronic document.

FIG. 5B is a flow diagram 550 that depicts an example approach for editing document security policy data for a particular electronic document, according to one embodiment of the invention. In step 552, security policy editor 502 attempts to connect to document security policy manager 112 via network 114. If in step 554 the connection attempt is successful, then in step 556 a dropdown list is populated with security classifications in the document security policy data received from the document security policy manager 112. If, in step 554 the connection attempt is not successful, then the security policy editor 502 retrieves the local document security policy data 506 stored on the network device 102. In step 560, a selection of available security classifications and corresponding access policies are displayed on the GUI 500. In step 562 a determination is made whether the particular electronic document exists in the current document security policy data. If so, then in step 564, the current security classification for the particular electronic document is retrieved and used as the default value. If not, then in step 566, a default document retention classification is used. In step 568, the user interface is displayed and user input is received specifying a document security classification.

According to one embodiment of the invention, security policy data manager 504 is configured to distribute document security policy data 506 to secure network device 102. Security policy data manager 504 may be configured to automatically provide document security policy data 506 to those elements that require the data. For example, security policy data manager 504 may be configured to provide document security policy data 506 to network devices based upon schedule data contained in schedule data 508. Security policy data manager 504 may be configured to query secure network device 102 to determine whether network device 102 requires document security policy data 506. Alternatively, network device 102 may request document security policy data 506 from security policy data manager 504. Furthermore, security policy data manager 504 may be configured to provide document security policy data 506 to secure network device 102 in response to document security policy data 506 being updated. For example, suppose that a user updates document security policy data 506 using security policy editor 502. An administrator may determine that document that document security policy data 506 needs to be updated to reflect a change in a document security policy. According to one embodiment of the invention, security policy data manager 504 is configured to automatically detect that document security policy data 506 has been updated and provide the updated document security policy data 506 to network device 102. Security report data 510 may include data that indicates details about the providing of document security policy data 506 to network devices, such as network device 102. For example, security report data 510 may indicate that a particular version of document security policy data 506 was provided to network device 102. Security report data 510 may also include data that indicates the results of a network device applying document security policies to electronic documents in response to access requests, as described in more detail hereinafter.

VI. Managing Access to Electronic Documents Using Document Retention Policies and Document Security Policies According to one embodiment of the invention, in response to detecting a request to access a particular electronic document stored on a network device, a document retention policy and a document security policy are applied to the particular electronic document. If, based upon application of the document retention policy to the particular electronic document, a determination is made that the particular electronic document is to be deleted, then the particular electronic document is deleted from the network device. If, based upon application of the document security policy to the particular electronic document, a determination is made that access to the particular electronic document should be denied, then access to the particular electronic document is denied.

Figures 6A, 6B:
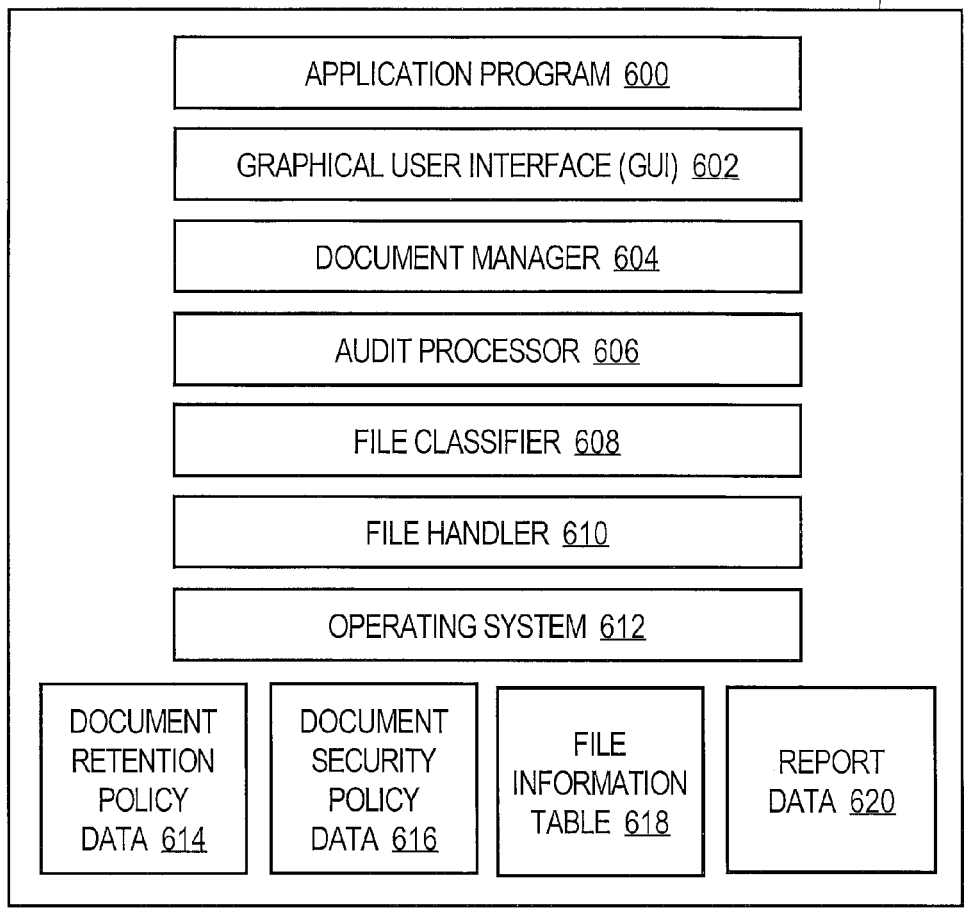
FIG. 6A is a block diagram that depicts example components and processes of network device.
FIG. 6B depicts contents of an example file information table that is used to manage access to electronic documents using document retention policies and document security policies.

FIG. 6A is a block diagram that depicts example components and processes of network device 102. Additional or fewer components and processes may be used, depending upon a particular implementation. In the example depicted in FIG. 6, network device 102 includes an application program 600, a graphical user interface (GUI) 602, a document manager 604, an audit processor 606, a file classifier 608, a file handler 610, an operating system (OS) 612, document retention policy data 614, document security policy data 616, a file information table 618 and report data 620. Application program 600 may be any type of application program that generates requests to access data. GUI 602 may be implemented by any mechanism that allows for the exchange of information between one or more users and network device 102. Document manager 604 is configured to participate in the management of access to electronic documents using document retention policies and document security policies as described herein. Audit processor 606 is configured to participate in applying document retention policies to electronic documents as described herein.

FIG. 6B depicts contents of an example file information table 618 that is used to manage access to electronic documents using document retention policies and document security policies, as described in more detail hereinafter. More specifically, file information table 618 is used to determine, for a particular electronic document, the corresponding document retention classification and document security classification. File information table 618 may also include other information, for example, a file name, a creation data and a location. The file name is the name of the file that contains the electronic document. The creation date is the creation date of the file that contains the electronic document. The creation date is useful for identifying particular electronic documents to be deleted on a document-by-document basis, for example if an document retention policy audit is conducted. For example, a particular document retention classification may have associated deletion criteria that specify deletion after one year from creation date of the document. In this situation, different electronic documents that have different creation dates, although all associated with the same particular document retention classification, are deleted at different times because of their different creation dates. The location indicates whether the file is stored locally on the particular element or on a removable storage media. For example, an "L" indicates that a particular electronic document is stored locally on network device 102, while an "R" indicates that the particular electronic document is stored on a removable medium or at another location. Additional data may be stored that indicates the particular location of an electronic document. For example, for a file having a location of "R", additional data may be maintained that identifies a particular removable medium where the file is stored. The additional data may specify, for example, a unique identifier of the removable medium. "O" indicates that the particular electronic document is stored in the other location accessible through the network. other location accessible through the network.

According to one embodiment of the invention, document manager 604 manages the creation and maintenance of file information table 618. For example, document manager 604 may operate in conjunction with file handler 610 to create and populate file information table 618. For example, file handler 610 detects that a save or copy command has been issued to operating system 612 and in response, creates an entry in file information table 618 for the file that was saved or copied. File handler 610 may also detect that a file name has been changed and update the corresponding file name in file information table 618. File classifier 608 then interacts with a user through GUI 602 to obtain the classification for each file, or to copy the classification of the original file, in the case of a file copy.

FIG. 7 is a flow diagram 700 that depicts an approach for managing access to electronic documents using document retention policies and document security policies. For purposes of explanation, this example is described in the context of managing access to a particular electronic document stored at network device 102, but the invention is not limited to this particular example or context.

In step 702, a request to access a particular electronic document is detected. This may be performed by different entities, depending upon a particular implementation. For example, document manager 604 may become aware of the request to access the particular electronic document, for example, by intercepting a request made by application program 600, or by being notified by operating system 612 that the request has been made.

In step 704, a document retention policy is identified and applied to the particular electronic document. This may include, for example, using data contained in file information table 618 to identify a particular document retention classification assigned to the particular electronic document. The document retention policy data 614 is then consulted to determine whether the deletion criteria for the particular document retention classification with respect to the particular electronic document is satisfied. For example, suppose that the data contained in file information table 618 indicate that the document retention classification assigned to the particular electronic document is C3. According to the table 200 depicted in FIG. 2, the deletion criteria for document retention classification C3 is one year. Thus, in the present example, a determination is made whether the particular electronic document has been in been in existence for more than one year. This may be determined, for example, by referring to the data contained in the file information table 618 that specifies details about electronic documents.

The document retention policy data 614 stored on network device 102 may be updated prior to applying the document retention policy, to ensure that the network device 102 has the most current version of document retention policy data 614. For example, document manager 604 may contact document retention policy manager 108 and request the latest version of document retention policy data. Document manager 604 receives and stores the document retention policy data 614 received from the document retention policy manager 108. If an error prevents document manager 604 from obtaining the current version of document retention policy data from, document retention policy manager 108, the document manager 604 may use the current version of document retention policy data 614 available on network device 102.

Document retention policy data 614 may be updated on a periodic basis or based upon other criteria. For example, when the document retention policy data is updated, the document retention policy manager 108 may notify network device 102 that an updated version of document retention policy data is available. Alternatively, the document retention policy manager 108 may automatically provide an updated version of document retention policy data to network device 102. As another alternative, FIG. 8 is a flow diagram 800 that depicts document manager 604 obtaining deletion criteria from document retention policy manager 108. In step 802, document manager 604 (or another process on network device 102) connects to document retention policy manager 108 via network 114. In step 804, a determination is made whether the attempt to connect to document retention policy manager 108 was successful. The attempt might not be successful, for example, if an error occurs on network 114 or at document retention policy manager 108. If the attempt is successful, then in step 806 the deletion criteria for a particular document retention classification is requested. For example, document manager 604 may use the data contained in file information table 618 to determine the document retention classification for the particular electronic document and then request the deletion criteria for the particular document retention classification from document retention policy manager 108.

In step 808, the deletion criteria is received from the document retention policy manager 108. In step 810, an expiration date is generated for the particular electronic document. For example, the expiration date may be generated by adding the retention length received from document retention policy manager 108 to the creation date for the particular electronic document. If, in step 804, the attempt to contact the document retention policy manager 108 was not successful, then in step 812, the retention length is retrieved from the local document retention policy data 614 stored on network device 102 and used to calculate the expiration date. As an alternative, a destruction date that is stored in association with the particular electronic document may be used as the expiration date. The use of destruction dates is described in more detail hereinafter.

In step 814, the calculated expiration date is compared to the current date to determine whether the particular electronic document should be deleted. If, in step 816, the current date is after the calculated expiration date, then in step 818, a decision is made to not retain the particular electronic document. If, in step 816, the current date is not after the calculated expiration date, then in step 820, a decision is made to retain the particular electronic document. Although the prior example was described in the context of the deletion criteria being a retention length, the invention is not limited to this example context and any type of deletion criteria may be used. The prior example was described in the context of applying the document retention policy to the particular electronic document at network device 102. The document retention policy may also be applied to the particular electronic document at other locations. For example, instead of requesting deletion criteria, such as a retention length, from the document retention policy manager 108, the security classification and creation date for the particular electronic document may be supplied to the document retention policy manager 108 with a request for a decision on whether the particular electronic document should be deleted. In this situation, the document retention policy manager 108 determines whether the particular electronic document should be retained based upon the information provided in the request and the document retention policy data maintained by the document retention policy manager 108.

Returning to FIG. 7, if in step 706, a determination has been made that, based upon application of the document retention policy to the particular electronic document, the particular electronic document should not be retained, then in step 708, the particular electronic document is deleted. For example, document manager 604 may instruct operating system 612 to delete the particular electronic document.

If, in step 706, a determination has been made that, based upon application of the document retention policy to the particular electronic document, the particular electronic document should be retained, then in step 710, a document security policy is identified and applied to the particular electronic document. As with application of the document retention policy previously described, the application of the document security policy may be performed at network device 102 based upon the document security policy data 616 stored at network device 102. For example, document manager 604 may use document security policy data 616 to determine whether a user associated with the request to access the particular electronic document is authorized to access the particular electronic document. Alternatively, application of a document security policy may be performed based upon information received from document security policy manager 112 or may be performed entirely at document security policy manager 112. Application of a document security policy may also involve other entities.

For example, FIG. 9 is a flow diagram 900 that depicts an approach for applying a document security policy to an electronic document according to one embodiment of the invention. In step 902, document manager 604 (or another process on network device 102) connects to document security policy manager 112 via network 114. In step 904, a determination is made whether the attempt to connect to document security policy manager 112 was successful. The attempt might not be successful, for example, if an error occurs on network 114 or at document security policy manager 112. If the attempt is successful, then in step 906 the current document security policy data is requested, so that network device 102 will have the latest version. In step 908, the current version of document security policy data is received by network device 102 from document security policy manager 112 and stored as document security policy data 616. The document security policy data is then used to determine the document security classification for the particular electronic document. The network device 102 may also receive from the document security policy manager 112 information contained in the file information table 618 for the particular electronic document, for example the security classification of the particular electronic document. If, in step 904, the attempt to contact the document security policy manager 112 was not successful, then in step 910, the local document security policy data 616 is used to determine the document security classification for the particular electronic document.

In step 912, document manager 604 accesses personnel information system 110 to request an authorization check. For example, document manager 604 may provide to personnel information system 110 data that identifies a user associated with the request to access the particular electronic document and the security classification of the particular electronic document. The personnel information system 110 determines whether the user is authorized to access the particular electronic document, based upon the security classification of the particular electronic document and information about the user. For example, suppose that the document security classification for the particular electronic document is R4. In this situation, only individuals who are at the director level or above are authorized to access the particular electronic document. Personnel information system 110 checks attributes of the user and transmits a response to the network device 102 indicating whether the user is authorized to access the particular electronic document. In step 914, the network device 102 receives the response from the personnel information system 110.

Returning to FIG. 7, if in step 712, as a result of applying the document security policy to the particular electronic document, the user is not authorized to access the particular electronic document, then in step 714, access to the particular electronic document is denied. For example, document manager 604 may instruct operating system 612 to deny access to the particular electronic document. According to one embodiment of the invention, denying access to a particular electronic document may be accomplished by causing the particular electronic document to be deleted. According to another embodiment of the invention, the particular actions take with respect to a particular electronic document are based upon the security classification of the particular electronic document. For example, electronic documents considered to be of high importance may be deleted while electronic documents of lower importance may be retained, but access to those electronic documents is denied to the application program that made the request. One example implementation is to cause deletion of electronic documents having a document security classification of R4 or higher, i.e., R4, R5 i.e., R4, R5 or S. Electronic documents having a security classification of R3, R2, R1 or U are retained, but the application program that made the request is denied access to the particular electronic document.

If, in step 712, a determination is made that, based upon application of the document security policy to the particular electronic document, access should be allowed to the particular electronic document, then in step 716 access to the electronic document is allowed. For example, application program 600 is allowed to access the particular electronic document.

VIII. Removable Media Applications

As indicated previously herein, there may be situations where a determination is made that an electronic document is to be deleted based upon application of a document retention policy and a document security policy, but the electronic document is located on a removable medium that is not currently accessible. For example, the removable medium may have been removed from an apparatus that is capable of reading from and/or writing to the removable medium. As described hereinafter, automatic or manual loading or auto-destruction code may be used to address this issue. A file attachment in an electronic email may be considered to be another application of a removable medium. In this application, auto-destruction code may be used as described in more detail hereinafter.

A. Auto-Loading and Manual Loading

According to one embodiment of the invention, an attempt is made to make the removable medium on which the electronic document is stored accessible so that the electronic document can be deleted from the removable medium. For example, an automatic mounting mechanism may be signaled to load the removable medium that contains the electronic document to be deleted. Examples of a removable medium include, without limitation, a tape, optical disk, such as a CD-ROM, DVD, etc., or diskette. If the signaling is successful and the removable medium becomes accessible, then the electronic document is deleted and audit report data 414 is updated accordingly. If the signaling is unsuccessful, then a user may be notified that the removable medium should be made accessible. This may include, for example, generating and sending an electronic notification to administrative personnel or other personnel or other users. The electronic notification may take a wide variety of forms, such as email, instant message, automated voicemail, facsimile, etc.

As an alternative to signaling an automatic mounting mechanism a user may be notified that the removable medium should be made accessible. The notification may take a wide variety of forms and content, depending upon a particular implementation. For example, a message may be generated for administrative personnel to request that they locate and load a particular removable medium.

Figure 10:
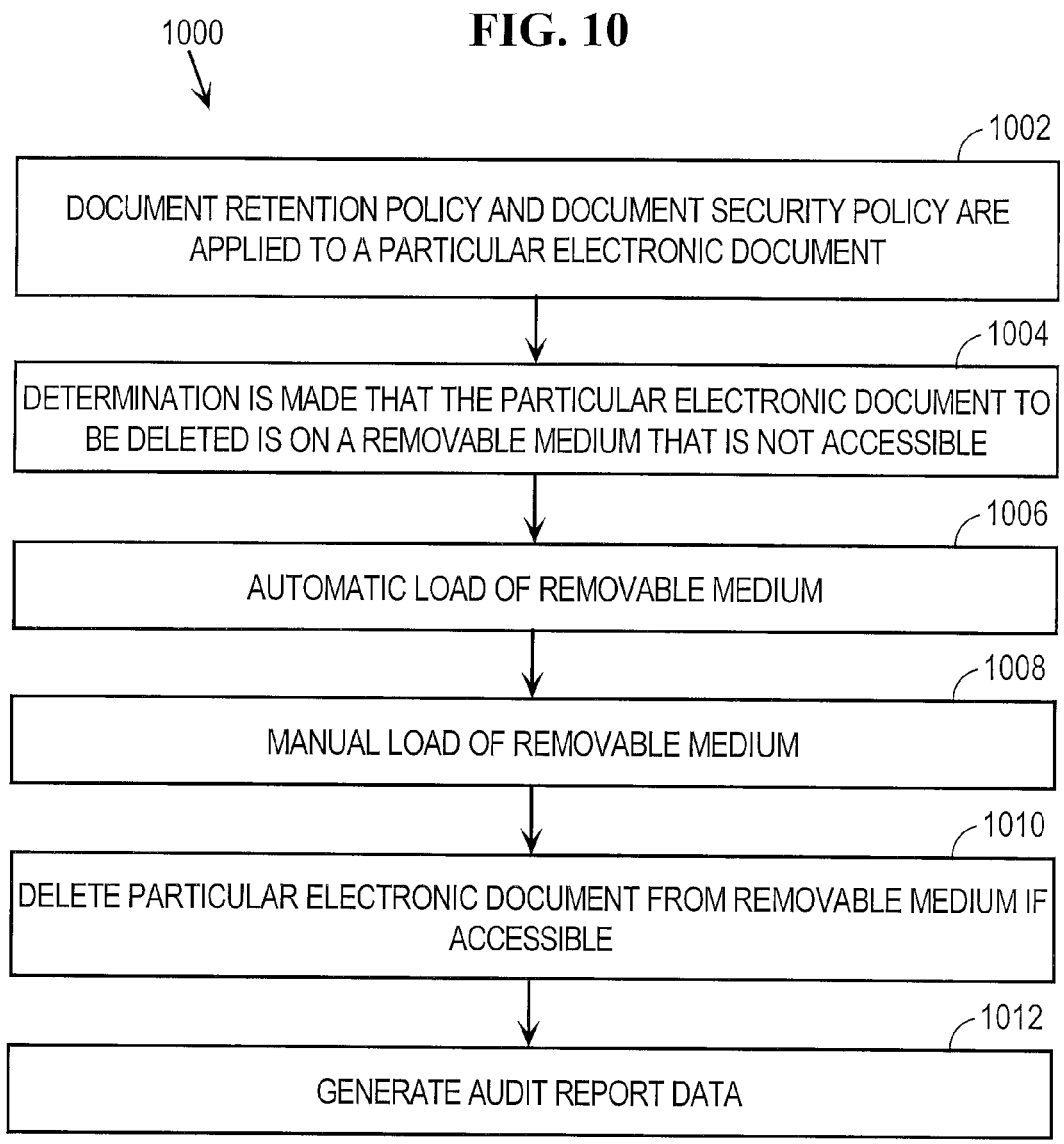
FIG. 10 is a flow diagram that depicts an approach for deleting electronic documents on a removable media.

FIG. 10 is a flow diagram 1000 that depicts an approach for deleting electronic documents on a removable media according to an embodiment of the invention. In step 1002, in response to detecting a request to access a particular electronic document stored on a network device, a document retention policy and a document security policy are applied to a particular electronic document. In step 1004, a determination is made, based upon application of the document retention policy and the document security policy that the particular electronic document is to be deleted. In the present example, it is presumed that the particular electronic document identified for deletion is stored on a removable medium. This may be determined by an examination of data contained in file information table 618, for example the location attribute. If the removable medium is accessible, then the particular electronic document is deleted from the removable medium.

If the removable medium is not accessible, then in step 1006, an attempt is made to make the removable medium accessible. This may include, for example, signaling an automatic loading mechanism to load the removable medium into a reader. Alternatively, in step 1008, a manual loading of the removable medium may be performed. Either the automatic loading or manual loading of steps 1006 or 1008 may include notifying a user, such as administrative personnel, to request that the removable medium be made accessible.

In step 1010, the particular electronic document is deleted from the removable medium if the removable medium has been made accessible and if the medium permits erasing of the data.

In step 1018, report data 620 is optionally generated that indicates the results of applying the document retention policy and the document security policy. This may include, for example, whether the particular electronic document was successfully deleted from the removable medium. The report data 620 may then be provided to document retention policy manager 108 and/or the document security policy manager 112.

B. Auto-Destruction Code

According to one embodiment of the invention, auto-destruction code is used to delete electronic documents stored on removable media that are no longer accessible. This approach is also effective in situations where data is attached to an electronic mail. In general, when an operation is detected for storing an electronic document, a determination is made when the electronic document will be deleted based upon a document retention policy. The electronic document, time data and destruction code are stored on a removable medium. The time data indicates the time at which the electronic document will be deleted based upon the document retention policy. The destruction code is a set of one or more instructions which, when processed by one or more processors, cause the electronic document to be deleted from the removable medium if a current time is on or after the time indicated by the time data.

Figure 11A:
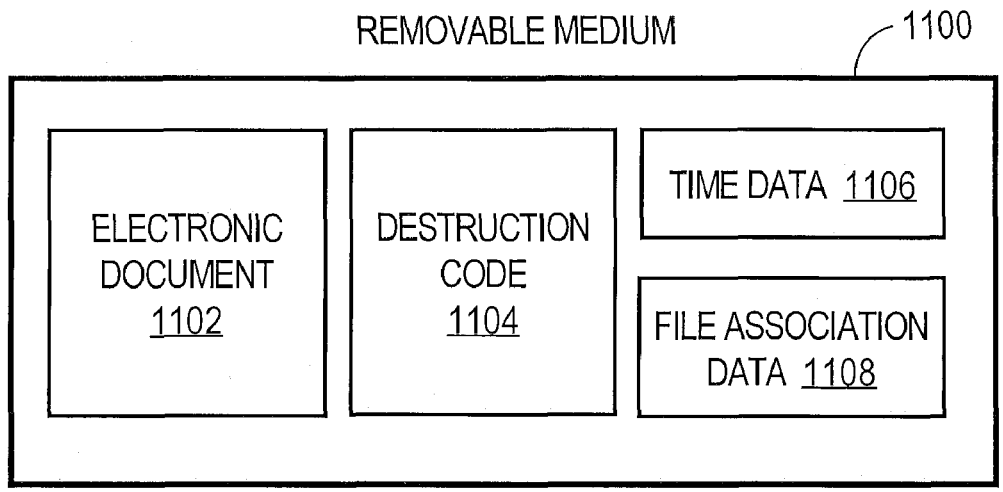
FIG. 11A is a block diagram that depicts a removable medium containing an electronic document, destruction code and time data.
Figure 11B:
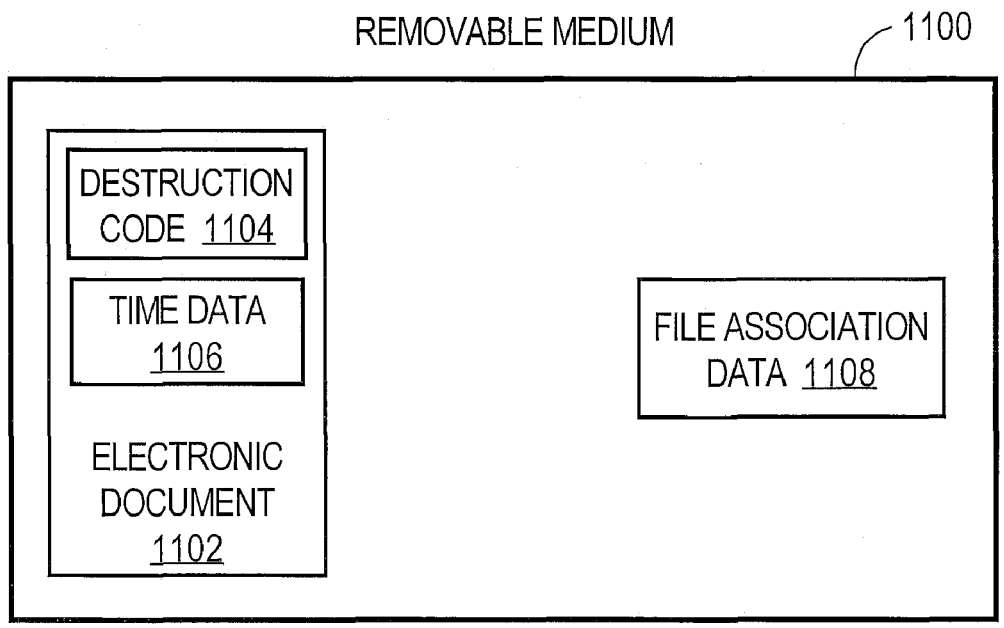
FIG. 11B depicts destruction code and time data 1106 included in an electronic document.

FIG. 11A is a block diagram that depicts a removable medium 1100 containing an electronic document 1102, destruction code 1104 and time data 1106. In FIG. 11A, destruction code 1104 is depicted as being disposed on removable medium 1100 separate from electronic document 1102. As depicted in FIG. 11B, destruction code 1104 and time data 1106 may be included in electronic document 1102. Destruction code 1104 may be configured in a manner such that when removable medium 1100 is inserted into an apparatus with a reading device that is compatible with removable medium 1100, that destruction code 1104 is processed, causing electronic document 1102 to be deleted. For example, many computing apparatuses will attempt to read the contents of a removable medium placed into the computing apparatus. Destruction code 1104 may be configured to be processed when this occurs. When destruction code 1104 is processed, the electronic document is deleted if a current time is on or after the time indicated by time data 1106.

Alternatively, the processing of destruction code 1104 may be triggered by an attempt to process electronic document 1102. For example, when removable medium 1100 is made accessible to a device capable of reading data from removable medium 1100, an attempt attempt may be made to process electronic document 1102, for example by reading or opening electronic document 1102. When this occurs, destruction code 1104 is processed and a determination is made whether the current time is on or after the time indicated by time data 1106. If so, then destruction code 1104 causes electronic document 1102 to be deleted. Destruction code 1104 may also cause the deletion of itself. In some situations, destruction code 1104 will be processed and a determination made that a current time is not on or after the time indicated by time data 1106. In this situation, electronic document 1102 is not deleted. Destruction code 1104 may be processed again at a later time, any number of times, until a determination is made that electronic document 1102 is to be deleted. In the situation where destruction code 1104 is included with electronic document 1102, electronic document 1102 may be moved to any number of different locations. Destruction code 1104 continues to be executed until a determination is made that electronic document 1102 is to be deleted.

File association data 1108 is data that causes destruction code 1104 to be processed when electronic document 1102 is accessed. For example, file association data 1108 may be used to re-direct a request to open electronic document 1102 and cause destruction code 1104 to be processed. In situations where destruction code 1104 is included (embedded) in electronic document 1102, the use of file association data 1108 may not be necessary because accessing electronic document 1102 can cause the processing of destruction code 1104.

In the context of email, the email itself may be considered to be the removable medium 1100. When an email is created and an electronic document is attached to the email, destruction code and time data is included with, attached to, or otherwise embedded in or transported with the email. File association data may also be used in the email context. The destruction code and time data may be carried in the email in a manner so that a user is not aware that the email includes the destruction code and time data. For example, the destruction code and time data (and also the file association data), may be embedded in the header of an email, attached has one or more hidden files, or included in an email using a very small font size or using a color to hide the data from a user. Other techniques may be used to prevent a user from detecting that the email includes destruction code and time data. Opening the electronic document attached to the email causes execution of the destruction code and a code and a current time is compared to the time indicated by the time data. If the current time is on or after the time indicated by the time data, then the destruction code causes the deletion of the electronic document.

FIG. 12 is a flow diagram 1200 that depicts an approach for deleting electronic documents on a removable media, according to an embodiment of the invention. In step 1202, an operation is detected to store an electronic document on a removable medium.

In step 1204, an electronic document retention classification associated with the electronic document is determined from a plurality of electronic document retention classifications. This may be accomplished, for example, by referring to file information table 500 and identifying the electronic document retention classification that corresponds to the electronic document.

In step 1206, a determination is made of a time at which the electronic document should be deleted based upon document retention policy data for the electronic document retention classification. The document retention policy data specifies one or more deletion criteria for the electronic document retention classification.

In step 1208, time data is generated that indicates the time at which the electronic document should be deleted based upon the document retention policy.

In step 1210, the electronic document, the time data and destruction code are stored to the removable medium. The destruction code is a set of one or more instructions which, when processed by one or more processors, cause the deletion of the electronic document. As previously described herein, the destruction code may be stored on the removable medium separate from or as part of the electronic document. File association data 1108 may also be generated and stored on the removable medium, depending upon the requirements of a particular implementation.

In step 1212, the destruction code is processed and the electronic document is deleted if the medium permits. As described above, the destruction code may cause the deletion of the electronic document in any location, regardless of whether the electronic document has been moved from the removable medium to another location. The problem may arise, however, if the medium such as WORM (write once read many) medium does not permit the deletion. In such a case, encryption should be used in conjunction with the document retention and document security policies.

IX. Self Extracting and Executable Data Implementations

Figure 13:
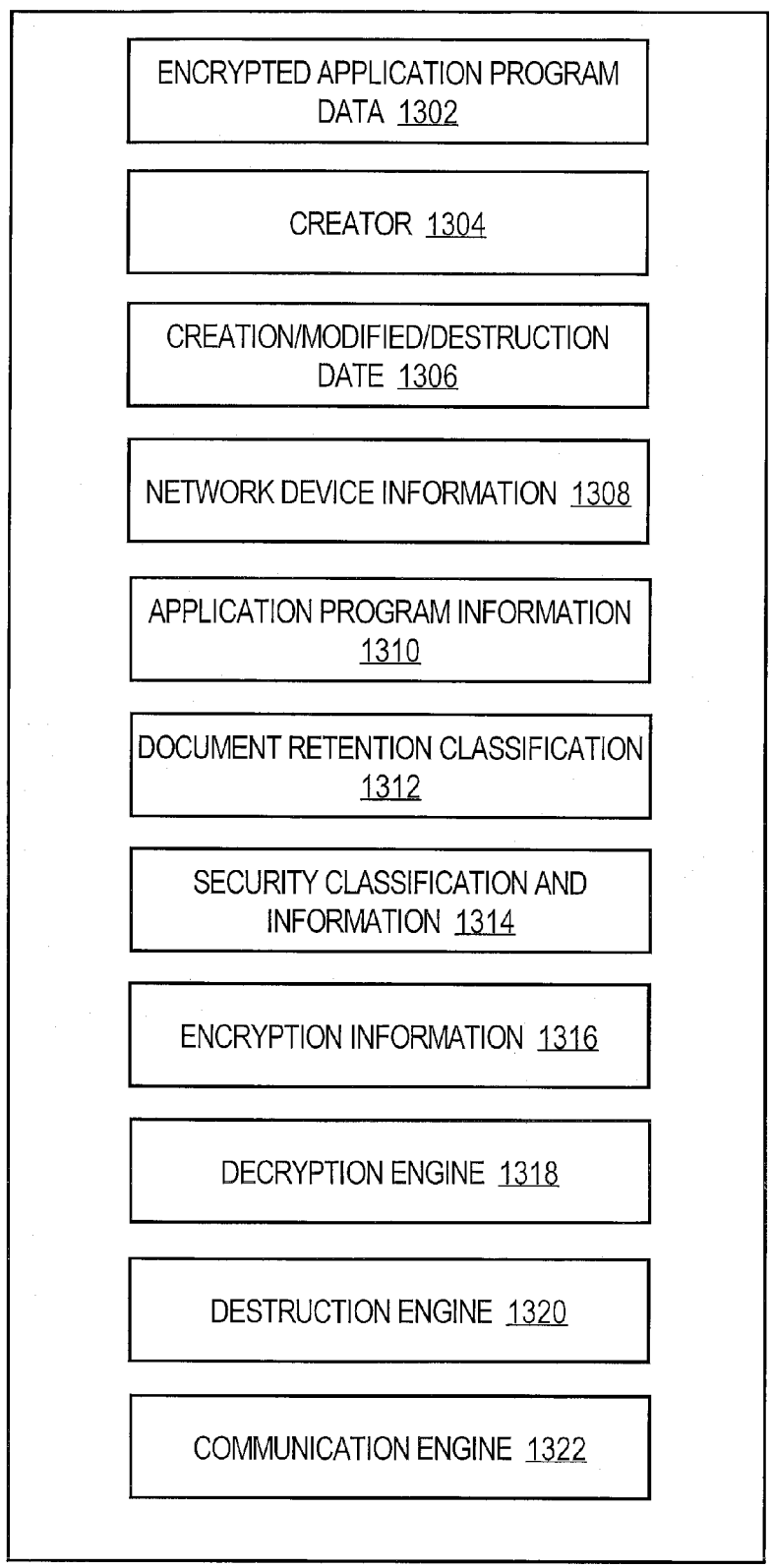
FIG. 13 is a block diagram that depicts example self-extracting and executable data for managing access to electronic documents using document retention policies and document security policies.

According to one embodiment of the invention, self-extracting and executable data file may be used to manage access to electronic documents using document retention policies and document security policies. FIG. 13 is a block diagram that depicts example self-extracting and executable data 1300 (hereinafter "data 1300") for managing access to electronic documents using document retention policies and document security policies, according to one embodiment of the invention. In general, data 1300 includes encrypted application program data along with all information necessary to control access to the encrypted application program data using document retention policies and document security policies. For example, processing of data 1300 may implement the steps depicted in FIG. 7. In the present example, data 1300 includes encrypted application program data 1302 that is data generated by an application program, such as application program 600, and encrypted by an encryption engine of file handler 610 that is depicted in more detail in FIG. 14 and described hereinafter. Creator 1304 is data that identifies a creator of the application program data. For example, creator 1304 may include data entered during a log in process. Creation/modified/destruction date 1306 is based upon a document retention classification specified for the application data. Network device information 1308 includes data that identifies a network device on which the application data was created. This may be used, for example, to determine an attempt to access data 1300 is made on the same network device on which the application data was created. Application program information 1310 includes data that identifies the application program used to create the application program data. This information may be used, for example, to execute the application program after the application program data is decrypted. Document retention classification 1312 is the document retention classification selected for the application program data. Security classification and information 1314 includes data that identifies the document security classification selected for the application program data. This information may be used, for example, to generate the graphical user interface when a user attempts to access the application program data. This information may be updated if changes are made to access policies for document security classifications, for example, on document security policy manager 112. Encryption manager 112. Encryption information 1316 is data that is used to encrypt and decrypt the application program data. Decryption engine 1318 is used to decrypt the encrypted application program data 1302 when the document retention policy and security policy are cleared. Therefore, even though the medium does not permit the deletion, data is secured through the encryption. The decrypted application program data is piped, i.e., provided, to an application program. Destruction engine 1320 is a self destruct mechanism configured to cause the deletion of data 1300 if the storage medium allows. Communication engine 1322 provides access to document retention policy manager 108, document security policy manager 112 and personnel information system 110.

Figure 14:
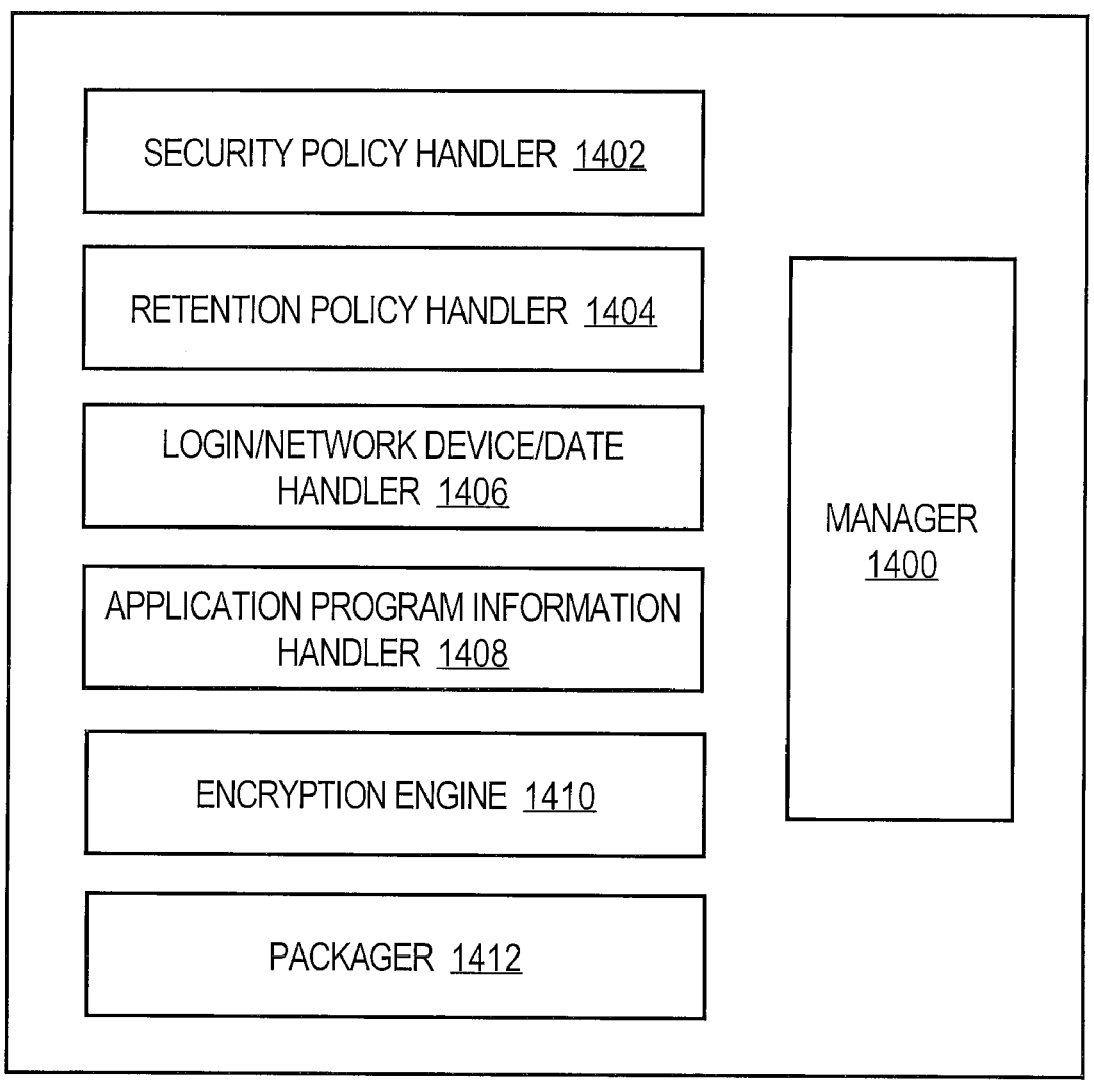
FIG. 14 is a block diagram that depicts an example implementation of a file handler.

FIG. 14 is a block diagram that depicts an example implementation of file handler 610, according to one embodiment of the invention. Other implementations may include fewer or additional elements, depending upon the requirements of a particular implementation. In this example, file handler 610 includes a manager 1400 configured to manage the process of creating data 1300. File handler 610 includes a security policy handler 1402 that retrieves document security policy data from document security policy manager 112, along with other security-related information, such as procedures for enforcing a document security classification, login procedures, biometric information, etc., as well as other security information. Security policy handler 1402 is also configured to retrieve local document security policy data 616 if there is a problem communicating with document security policy manager 112.

For example, security policy handler 1402 may implement the approach depicted in FIG. 9 for retrieving document security policy data. File handler 610 also includes a retention policy handler 1404 that is configured to retrieve document retention policy data from document retention policy manager 108, or local document retention policy data 614, if there is a problem communicating with document retention policy manager 108. For example, retention policy handler 1404 may implement the approach depicted in FIG. 8 for retrieving document retention policy data. A login/network device/date handler 1406 obtains information about a user, the current network device and current date information. This information is used to generate the data 1300. An application program information handler 1408 interacts with application program 600 to obtain the necessary information to call the application program 600 when data 1300 is accessed. An encryption engine 1410 encrypts the encrypts the application program data to be included in data 1300. A packager 1412 packages the various elements of data 1300 to create data 1300.

Figure 15:
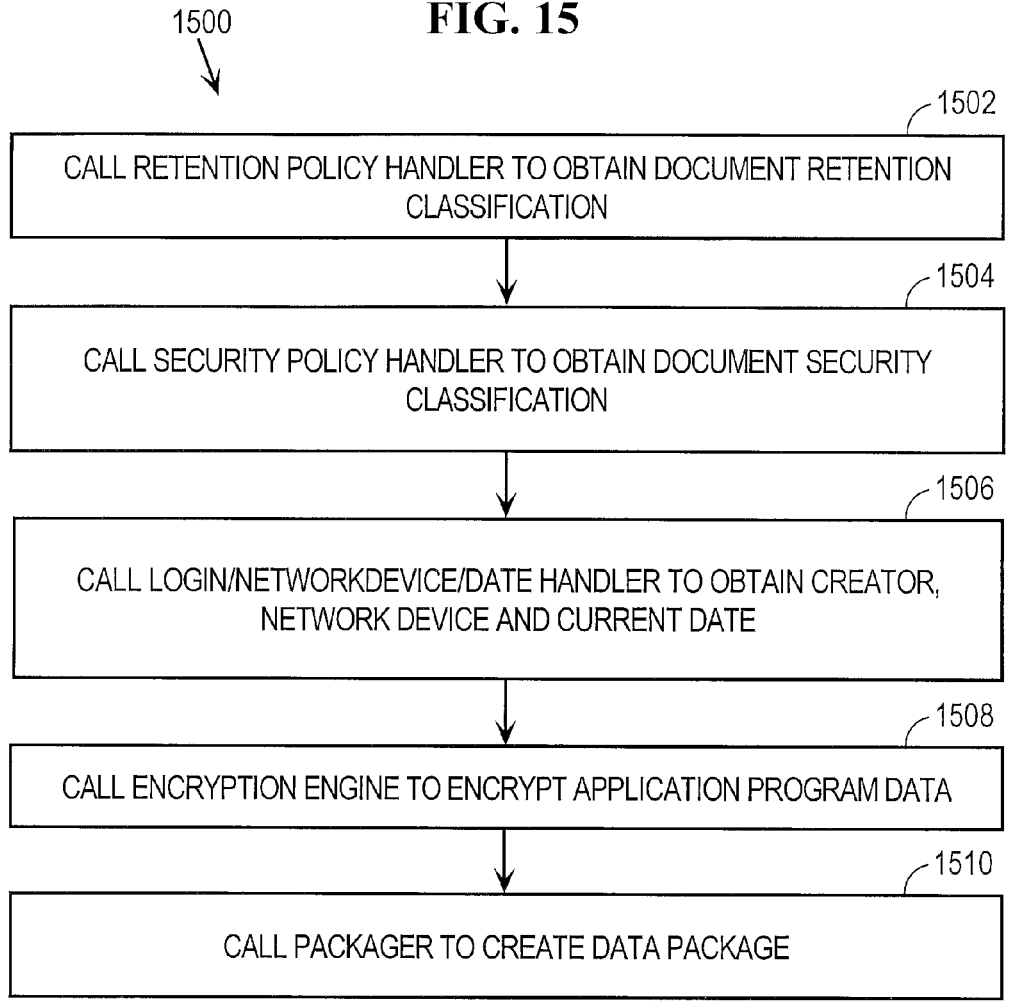
FIG. 15 is a flow diagram that depicts an example approach for a file handler to create self-extracting and executable data.

FIG. 15 is a flow diagram 1500 that depicts an example approach for file handler 610 to create data 1300. In step 1502, the retention policy handler 1404 is called to obtain the document retention classification. In step 1504, the security policy handler 1402 is called to obtain the document security classification. In step 1506, the login/network device/date handler 1406 is called to obtain the name of the creator, the network device on which the application program data was created and the current date. In step 1508, the encryption engine 1410 is called to encrypt the application program data. In step 1510, the packager 1412 is called to generate the data 1300.

X. Implementation Mechanisms

Figure 16:
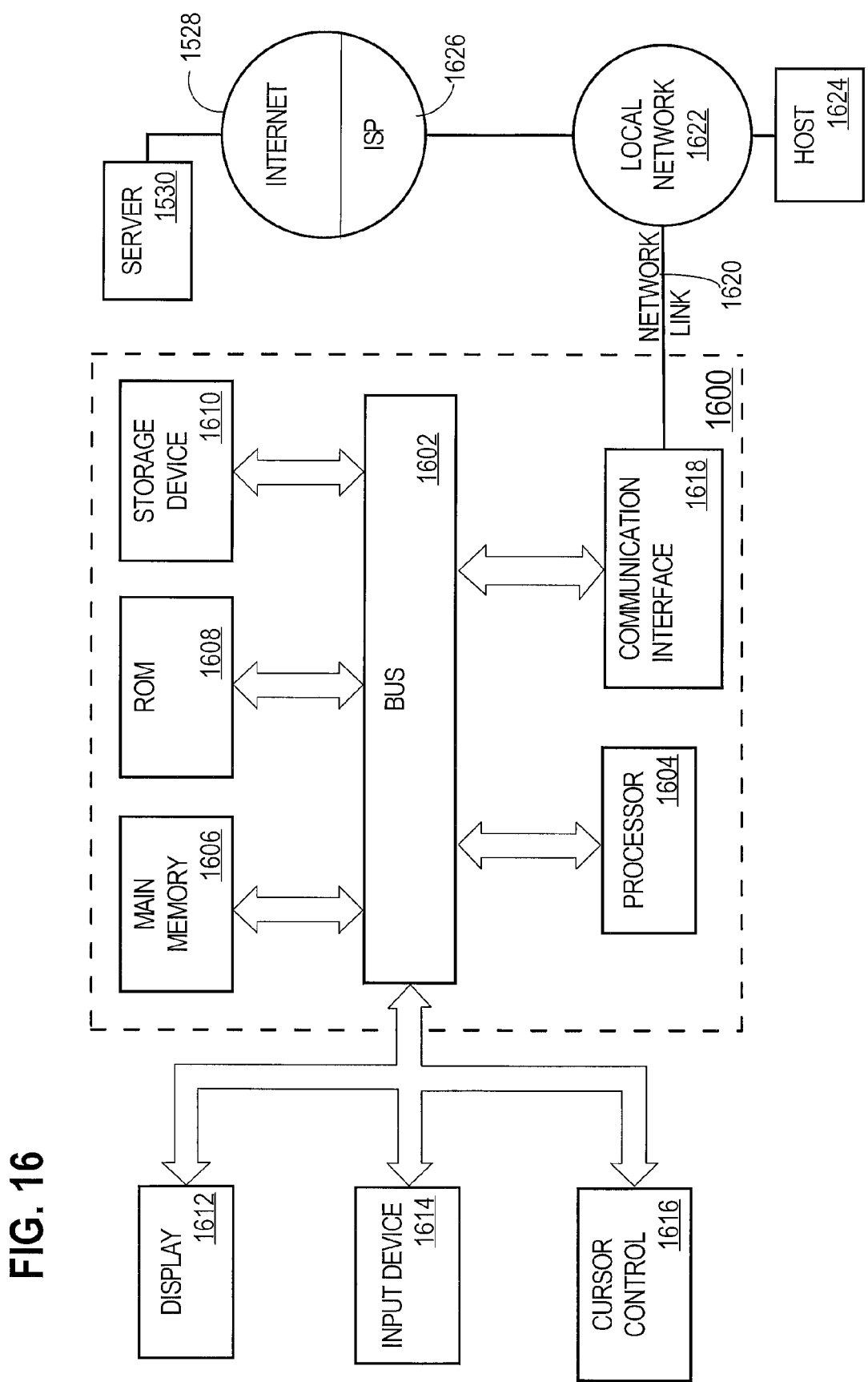
FIG. 16 is a block diagram of a computer system on which embodiments of the invention may be implemented.

The approach described herein for managing access to electronic documents using document retention policies and document security policies may be implemented on a wide variety of computer architectures and platforms. For purposes of explanation, FIG. 16 is a block diagram that depicts an example computer system 1600 upon which embodiments of the invention may be implemented. Computer system 1600 includes a bus 1602 or other communication mechanism for communicating information, and a processor 1604 coupled with bus 1602 for processing information. Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

The invention is related to the use of computer system 1600 for implementing the techniques described herein. According to one embodiment of the invention, those techniques are performed by computer system 1600 in response to processor 1604 executing one or more sequences of one or more instructions contained in main memory 1606. Such instructions may be read into main memory 1606 from another computer-readable medium, such as storage device 1610. Execution of the sequences of instructions contained in main memory 1606 causes processor 1604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 1600, various computer-readable media are involved, for example, in providing instructions to processor 1604 for execution. Such a medium may take many forms, including but not limited to, non-volatile media and volatile media. Non-volatile media includes, for example, optical or magnetic disks, such as storage device 1610. Volatile media includes dynamic memory, such as main memory 1606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1604 for execution. For example, the instructions may initially be carried on a magnetic disk of a remote computer. The remote remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618. The received code may be executed by processor 1604 as it is received, and/or stored in storage storage device 1610, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim 1n any way. The specification and drawings are, accordingly, to be regarded in an illustrative rather than a restrictive sense.

What is claimed is:

1. A computer-implemented method for managing access to electronic documents, the computer-implemented method comprising:

at a network device, detecting a request to access a particular electronic document stored on the network device; and in response to detecting the request to access the particular electronic document stored on the network device, applying a document retention policy to the particular electronic document by:

determining that the particular electronic document belongs to a particular electronic document retention classification from a plurality of electronic document retention classifications, retrieving document retention policy data for the particular electronic document retention classification, wherein the document retention policy data for the particular document retention classification specifies one or more deletion criteria for the particular document retention classification, determining whether any of the one or more deletion criteria for the particular electronic document retention classification are satisfied, if any of the one or more deletion criteria for the particular electronic document retention classification are satisfied, then causing the particular electronic document to be deleted, if none of the one or more deletion criteria for the particular electronic document retention classification are satisfied, then applying a document security policy to the particular electronic document by:

determining that the particular electronic document belongs to a particular document security classification from the plurality of document security classifications, retrieving document security policy data for the particular document security classification, wherein the document security policy data for the particular document security classification specifies one or more access criteria for the particular document security classification, determining, based upon the one or more access criteria for the particular document security classification and one or more attributes of a user associated with the request to access the particular electronic document, whether the user is authorized to access the particular electronic document, and if the user is not authorized to access the particular electronic document, then preventing access to the particular electronic document.

2. The computer-implemented method as recited in claim 1, wherein:

the one or more deletion criteria for the particular electronic document classification include a retention time, determining whether any of the one or more deletion criteria for the particular electronic document retention classification are satisfied includes determining whether the particular electronic document has existed for at least the retention time, and if the particular electronic has existed for at least the retention time, then causing the particular electronic document to be deleted.

3. The computer-implemented method as recited in claim 1, wherein:

the one or more access criteria for the particular document security classification specifies a security level, and determining, based upon the one or more access criteria for the particular document security classification and one or more attributes of a user associated with the request to access the particular electronic document, whether the user is authorized to access the particular electronic document includes determining whether the user associated with the request to access the particular electronic document is authorized to access electronic documents assigned to the security level.

4. The computer-implemented method as recited in claim 1, wherein:

the request to access the particular electronic document is generated by a particular application program, and preventing access to the particular electronic document includes preventing the particular application program from accessing the particular electronic document.

5. The computer-implemented method as recited in claim 1, wherein preventing access to the particular electronic document includes performing one or more actions based upon a security level of the particular document security classification to which the particular electronic document belongs.

6. The computer-implemented method as recited in claim 1, wherein determining, based upon the one or more access criteria for the particular electronic document, whether a user associated with the request to access the particular electronic document is authorized to access the particular electronic document includes:

at the network device generating and transmitting over a network to a personnel information system a request to perform an authorization check to determine whether the user is authorized to access the particular electronic document, and receiving at the network device from the personnel information system over the network a response indicating whether the user is authorized to access the particular electronic document.

7. The computer-implemented method as recited in claim 1, further comprising if both none of the one or more deletion criteria for the particular electronic document retention classification are satisfied and the user is authorized to access the particular electronic document, then decrypting the particular electronic document to generate a decrypted particular electronic document and granting access to the decrypted particular electronic document.

8. The computer-implemented method as recited in claim 1, further comprising generating self-executing data which, when processed by one or more processors, causes performance of the steps in response to detecting the request to access the particular electronic document stored on the network device.

9. A non-transitory computer-readable medium for managing access to electronic documents, the computer-readable medium carrying instructions which, when processed by one or more processors, causes:
  at a network device, detecting a request to access a particular electronic document stored on the network device; and
  in response to detecting the request to access the particular electronic document stored on the network device, applying a document retention policy to the particular electronic document by:
    determining that the particular electronic document belongs to a particular electronic document retention classification from a plurality of electronic document retention classifications,
    retrieving document retention policy data for the particular electronic document retention classification, wherein the document retention policy data for the particular document retention classification specifies one or more deletion criteria for the particular document retention classification,
    determining whether any of the one or more deletion criteria for the particular electronic document retention classification are satisfied,
    if any of the one or more deletion criteria for the particular electronic document retention classification are satisfied, then causing the particular electronic document to be deleted,
    if none of the one or more deletion criteria for the particular electronic document retention classification are satisfied, then applying a document security policy to the particular electronic document by:
      determining that the particular electronic document belongs to a particular document security classification from the plurality of document security classifications,
      retrieving document security policy data for the particular document security classification, wherein the document security policy data for the particular document security classification specifies one or more access criteria for the particular document security classification,
      determining, based upon the one or more access criteria for the particular document security classification and one or more attributes of a user associated with the request to access the particular electronic document, whether the user is authorized to access the particular electronic document, and
      if the user is not authorized to access the particular electronic document, then preventing access to the particular electronic document.

10. The non-transitory computer-readable medium as recited in claim 9, wherein:
  the one or more deletion criteria for the particular electronic document classification include a retention time,
  determining whether any of the one or more deletion criteria for the particular electronic document retention classification are satisfied includes determining whether the particular electronic document has existed for at least the retention time, and
  if the particular electronic has existed for at least the retention time, then causing the particular electronic document to be deleted.

11. The non-transitory computer-readable medium as recited in claim 9, wherein:
  the one or more access criteria for the particular document security classification specifies a security level, and
  determining, based upon the one or more access criteria for the particular document security classification and one or more attributes of a user associated with the request to access the particular electronic document, whether the user is authorized to access the particular electronic document includes determining whether the user associated with the request to access the particular electronic document is authorized to access electronic documents assigned to the security level.

12. The non-transitory computer-readable medium as recited in claim 9, wherein:
  the request to access the particular electronic document is generated by a particular application program, and
  preventing access to the particular electronic document includes preventing the particular application program from accessing the particular electronic document.

13. The non-transitory computer-readable medium as recited in claim 9, wherein preventing access to the particular electronic document includes performing one or more actions based upon a security level of the particular document security classification to which the particular electronic document belongs.

14. The non-transitory computer-readable medium as recited in claim 9, wherein determining, based upon the one or more access criteria for the particular electronic document, whether a user associated with the request to access the particular electronic document is authorized to access the particular electronic document includes:
  at the network device generating and transmitting over a network to a personnel information system a request to perform an authorization check to determine whether the user is authorized to access the particular electronic document, and
  receiving at the network device from the personnel information system over the network a response indicating whether the user is authorized to access the particular electronic document.

15. The non-transitory computer-readable medium as recited in claim 9, further comprising additional instructions which, when processed by the one or more processors, causes if both none of the one or more deletion criteria for the particular electronic document retention classification are satisfied and the user is authorized to access the particular electronic document, then decrypting the particular electronic document to generate a decrypted particular electronic document and granting access to the decrypted particular electronic document.

16. The non-transitory computer-readable medium as recited in claim 9, further comprising self-executing data which, when processed by one or more processors, causes performance of the steps in response to detecting the request to access the particular electronic document stored on the network device.

17. An apparatus for managing access to electronic documents, the apparatus comprising a memory storing instructions which, when processed by one or more processors, causes:

at a network device, detecting a request to access a particular electronic document stored on the network device; and in response to detecting the request to access the particular electronic document stored on the network device, applying a document retention policy to the particular electronic document by:

determining that the particular electronic document belongs to a particular electronic document retention classification from a plurality of electronic document retention classifications, retrieving document retention policy data for the particular electronic document retention classification, wherein the document retention policy data for the particular document retention classification specifies one or more deletion criteria for the particular document retention classification, determining whether any of the one or more deletion criteria for the particular electronic document retention classification are satisfied, if any of the one or more deletion criteria for the particular electronic document retention classification are satisfied, then causing the particular electronic document to be deleted, if none of the one or more deletion criteria for the particular electronic document retention classification are satisfied, then applying a document security policy to the particular electronic document by:

determining that the particular electronic document belongs to a particular document security classification from the plurality of document security classifications, retrieving document security policy data for the particular document security classification, wherein the document security policy data for the particular document security classification specifies one or more access criteria for the particular document security classification, determining, based upon the one or more access criteria for the particular document security classification and one or more attributes of a user associated with the request to access the particular electronic document, whether the user is authorized to access the particular electronic document, and if the user is not authorized to access the particular electronic document, then preventing access to the particular electronic document.

18. The apparatus as recited in claim 17, wherein:

the one or more deletion criteria for the particular electronic document classification include a retention time, determining whether any of the one or more deletion criteria for the particular electronic document retention classification are satisfied includes determining whether the particular electronic document has existed for at least the retention time, and if the particular electronic has existed for at least the retention time, then causing the particular electronic document to be deleted.

19. The apparatus as recited in claim 17, wherein:

the one or more access criteria for the particular document security classification specifies a security level, and determining, based upon the one or more access criteria for the particular document security classification and one or more attributes of a user associated with the request to access the particular electronic document, whether the user is authorized to access the particular electronic document includes determining whether the user associated with the request to access the particular electronic document is authorized to access electronic documents assigned to the security level.

20. The apparatus as recited in claim 17, wherein:

the request to access the particular electronic document is generated by a particular application program, and preventing access to the particular electronic document includes preventing the particular application program from accessing the particular electronic document.

\* \* \* \* \*